US011735937B2

(12) United States Patent
Neubecker et al.

(10) Patent No.: US 11,735,937 B2
(45) Date of Patent: Aug. 22, 2023

(54) METHODS AND APPARATUS FOR VEHICLE-BASED DRONE CHARGING

(71) Applicant: Ford Motor Company, Dearborn, MI (US)

(72) Inventors: Cynthia M. Neubecker, Westland, MI (US); Brad Ignaczak, Canton, MI (US); Somak Datta Gupta, Canton, MI (US); Brian Bennie, Sterling Heights, MI (US)

(73) Assignee: Ford Motor Company, Dearborn, MI (US)

( * ) Notice: Subject to any disclaimer, the term of this patent is extended or adjusted under 35 U.S.C. 154(b) by 948 days.

(21) Appl. No.: 16/461,950

(22) PCT Filed: Nov. 30, 2016

(86) PCT No.: PCT/US2016/064142
§ 371 (c)(1),
(2) Date: May 17, 2019

(87) PCT Pub. No.: WO2018/101926
PCT Pub. Date: Jun. 7, 2018

(65) Prior Publication Data
US 2019/0299802 A1    Oct. 3, 2019

(51) Int. Cl.
*B60L 53/66* (2019.01)
*B60L 53/65* (2019.01)
(Continued)

(52) U.S. Cl.
CPC ............ *H02J 7/0044* (2013.01); *B60L 53/65* (2019.02); *B60L 53/665* (2019.02); *B60L 53/68* (2019.02);
(Continued)

(58) Field of Classification Search
CPC ........ B64C 2201/208; B64C 2201/066; B64C 39/024; G01C 21/3438; H02J 7/0044;
(Continued)

(56) References Cited

U.S. PATENT DOCUMENTS 7,714,536 B1   5/2010 Silberg et al.
8,511,606 B1   8/2013 Lutke et al.
(Continued)

FOREIGN PATENT DOCUMENTS

CN    102760916    10/2012
CN    204144983    2/2015
(Continued)

OTHER PUBLICATIONS

International Seraching Authority, "International Search Report and Written Opinion," issued in connection with International Patent Application No. PCT/US2016/064142, dated Feb. 3, 2017, 9 pages.
(Continued)

*Primary Examiner* — Russell Frejd
*Assistant Examiner* — Sara J Lewandroski
(74) *Attorney, Agent, or Firm* — Brandon Hicks; Hanley, Flight & Zimmerman, LLC

(57) ABSTRACT

Methods and apparatus for vehicle-based drone charging are disclosed herein. A vehicle-based drone charging apparatus includes a charging device to be operatively coupled to a vehicle. The charging device is to charge a drone in response to the drone being operatively coupled to the charging device. The vehicle-based drone charging apparatus further includes a communication interface to be operatively coupled to the vehicle. The communication interface is to broadcast use information associated with the charging device. The use information includes location information associated with a location of the vehicle and fee information associated with a cost for use of the charging device.

19 Claims, 10 Drawing Sheets

(51) Int. Cl.
*B60L 53/68* (2019.01)
*H02J 7/00* (2006.01)
*B64C 39/02* (2023.01)
*H02J 50/10* (2016.01)
*B64U 50/34* (2023.01)
*B64U 80/86* (2023.01)

(52) U.S. Cl.
CPC .......... *B64C 39/024* (2013.01); *H02J 7/0014* (2013.01); *B60L 2240/70* (2013.01); *B64U 50/34* (2023.01); *B64U 80/86* (2023.01); *H02J 7/00034* (2020.01); *H02J 50/10* (2016.02); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
CPC ...... H02J 7/0014; H02J 7/00034; H02J 50/10; B60L 53/65; B60L 53/665; B60L 53/68; B60L 2240/70; B64U 50/34; B64U 80/86; Y02T 10/70; Y02T 10/7072; Y02T 10/72; Y02T 90/12; Y02T 90/14; Y02T 90/16; Y02T 90/167; Y02S 30/14
See application file for complete search history.

(56) References Cited

U.S. PATENT DOCUMENTS

| | | | |
|---|---|---|---|
| 8,862,288 | B2 | 10/2014 | Vavrina et al. |
| 9,056,676 | B1 | 6/2015 | Wang |
| 9,346,560 | B2 | 5/2016 | Wang |
| 2010/0225475 | A1 | 9/2010 | Karch et al. |
| 2015/0134467 | A1* | 5/2015 | Penilla ................... B60L 53/80 705/16 |
| 2015/0183326 | A1 | 7/2015 | Ryberg et al. |
| 2016/0009413 | A1 | 1/2016 | Lee et al. |
| 2016/0196756 | A1 | 7/2016 | Prakash et al. |
| 2016/0368464 | A1* | 12/2016 | Hassounah ............. B60L 53/80 |
| 2017/0015414 | A1* | 1/2017 | Chan ....................... H02G 1/02 |
| 2017/0344000 | A1* | 11/2017 | Krishnamoorthy .. G08G 5/0013 |
| 2018/0141453 | A1* | 5/2018 | High ...................... B60L 53/80 |
| 2018/0257502 | A1* | 9/2018 | Park ........................ H02J 50/12 |
| 2019/0295426 | A1* | 9/2019 | Nilsson ................. B64C 39/024 |

FOREIGN PATENT DOCUMENTS

| | | |
|---|---|---|
| CN | 105006862 | 10/2015 |
| CN | 105790350 | 7/2016 |
| CN | 106058985 | 10/2016 |
| EP | 2402205 | 4/2012 |
| GB | 2530626 | 3/2016 |

OTHER PUBLICATIONS

Davies, "Just How Likely are Cars with Helper-Drones," [http://www.slashgear.com/usthowlikelyarecarswithhelperdrones12409277/], Oct. 12, 2015, 7 pages.

Toksoz, "Automated Battery Swap and Recharge to Enable Persistent UAV Missions," American Institute of Aeronautics and Astronautics, 2011, 10 pages.

Patent Cooperation Treaty, "International Preliminary Report of Patentability," issued in connection with International Patent Application No. PCT/US2016/064142, dated Jun. 4, 2019, 1 page.

International Searching Authority, "Written Opinion," issued in connection with International Patent Application No. PCT/US2016/064142, dated Feb. 3, 2017, 5 pages.

China National Intellectual Property Administration, "Office Action," dated Nov. 18, 2022 in connection with Chinese Patent Application No. 2016800911581, 12 pages, including translation.

\* cited by examiner ered to as drones, are prevalent in both recreational activities and commercial activities (e.g., aerial surveying, photography, delivery of packages, etc.). Recreational and commercial drones, denoted as "small" unmanned aircraft systems (sUAS), are typically battery powered, with flight times being limited due to operational constraints on battery weight. This limited battery life, and correspondingly limited flight time, compromises drone usability. A depleted and/or discharged drone battery must either be recharged or replaced with a precharged battery in order to extend the usability of the drone

METHODS AND APPARATUS FOR VEHICLE-BASED DRONE CHARGING

FIELD OF THE DISCLOSURE

This disclosure relates generally to methods and apparatus for drone charging and, more specifically, to methods and apparatus for vehicle-based drone charging.

BACKGROUND

Unmanned aerial vehicles (UAVs) or unmanned aircraft systems (UAS), commonly ref

SUMMARY

Methods and apparatus for vehicle-based drone charging are disclosed herein. In some examples, a vehicle-based drone charging apparatus is disclosed. In some disclosed examples, the charging apparatus includes a charging device to be operatively coupled to a vehicle. In some disclosed examples, the charging device is to charge a drone in response to the drone being operatively coupled to the charging device. In some disclosed examples, the vehicle-based drone charging apparatus further includes a communication interface to be operatively coupled to the vehicle. In some disclosed examples, the communication interface is to broadcast use information associated with the charging device. In some disclosed examples, the use information includes location information associated with a location of the vehicle and fee information associated with a cost for use of the charging device.

In some examples, a method to charge a drone via a vehicle-based drone charging apparatus is disclosed. In some disclosed examples, the method includes broadcasting use information via a communication interface operatively coupled to a vehicle. In some disclosed examples, the use information is associated with a charging device operatively coupled to the vehicle. In some disclosed examples, the use information includes location information associated with a location of the vehicle and fee information associated with a cost for use of the charging device. In some disclosed examples, the method further includes charging the drone via the charging device in response to the drone being operatively coupled to the charging device.

In some examples, a tangible machine readable storage medium comprising instructions is disclosed. In some disclosed examples, the instructions, when executed, cause a processor to broadcast use information via a communication interface operatively coupled to a vehicle. In some disclosed examples, the use information is associated with a charging device operatively coupled to the vehicle. In some disclosed examples, the use information includes location information associated with a location of the vehicle and fee information associated with a cost for use of the charging device. In some disclosed examples, the instructions, when executed, further cause the processor to charge the drone via the charging device in response to the drone being operatively coupled to the charging device.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

The disclosed methods and apparatus provide new options and benefits for operators of drones. In some examples, drone operators seeking to extend flight time have had to purchase, charge and travel with multiple battery packs (e.g., charging numerous Lithium polymer (LiPos) batteries). In other examples, drone operators seeking to extend flight time have had to purchase and travel with charging stations having an AC inverter and deep cycle batteries or generators (e.g., 1000 W or 2000 W, such as the Honda EU2000, etc.). While these solutions have enabled some drone operators to achieve longer flight times, at considerable cost and effort, conventional options are costly and cumbersome for drone operators and still fail to address potential ranges of operation that might be required of nascent autonomous drones. The disclosed methods and apparatus provide a new drone charging solution, usable by both drone operators and by autonomous drones, potentially alleviating some of the cost or inconvenience of conventional charging solutions (e.g., bringing multiple battery packs or charging systems) and can extend operation ranges of autonomous drones.

Figure 1:
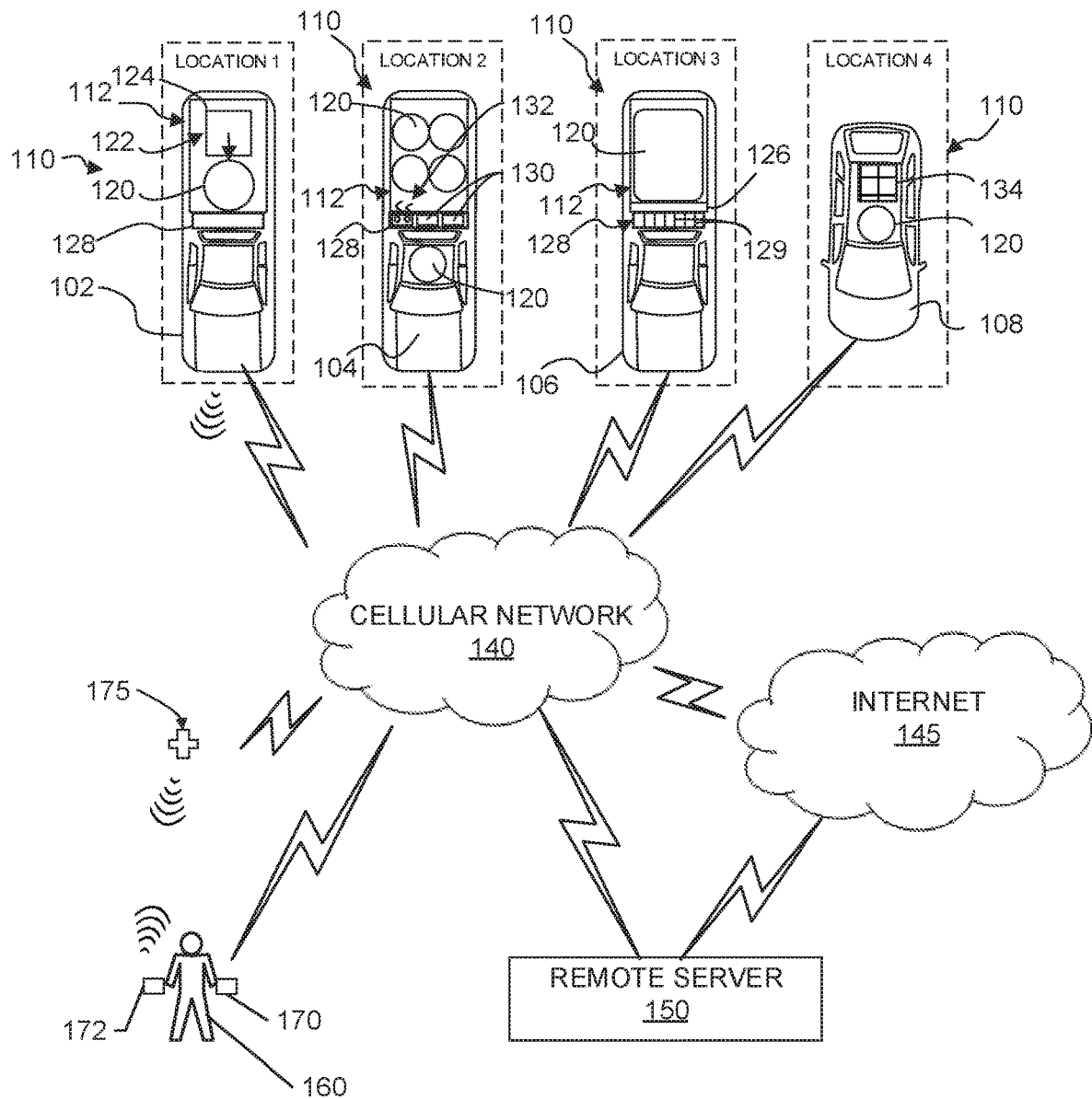
FIG. 1 illustrates an example environment of use in which an example vehicle-based drone charging apparatus of an example vehicle is to charge a drone.

FIG. 1 illustrates an example environment of use 100 in which an example vehicle-based drone charging apparatus of an example vehicle is to charge a drone. In FIG. 1, a first example vehicle 102, a second example vehicle 104, a third example vehicle 106, and a fourth example vehicle 108 are shown. Each of the first, second, third and fourth vehicles includes an example vehicle-based drone charging apparatus 110 having one or more example charging device(s) 120 to charge a drone responsive to an operative coupling of the drone to the charging device 120. In the illustrated example of FIG. 1, the first, second and third vehicles 102, 104, 106 are pick-up trucks having truck beds 112 in which one or more charging device(s) 120 are disposed. In the illustrated example of FIG. 1, the fourth vehicle 108 is an automobile including a charging device 120 on a roof of the passenger compartment. As is represented in the first, second, third and fourth example vehicles 102, 104, 106, 108, the charging device 120 may be positioned on any drone-accessible surfaces of the vehicle. To illustrate, the first vehicle 102 includes two example charging devices 120 in the truck bed 112 of the first vehicle 102. The second vehicle 104 has four example charging devices 120 in the truck bed 112 of the second vehicle 104 and one charging device 120 disposed on the roof of the second vehicle 104. The third vehicle 106 has one large charging device 120 occupying a large portion of the truck bed 112 of the third vehicle 106. The fourth vehicle 108 includes a charging device 120 disposed on the roof of the fourth vehicle 108.

In some examples, the charging device 120 provides a matrix of addressable regions that are dynamically configurable to adapt to a size of a drone or drones requiring charging services. For example, the large charging device 120 of the third vehicle 106 is operably configurable to service a single large drone or a plurality of smaller drones.

In the illustrated example of FIG. 1, the first example vehicle 102 is further shown to include an example load receptacle 122 to receive and securely store a load carried by a drone for which charging via the charging device 120 is requested. In some examples, the load receptacle 122 includes a movable cover 124 (e.g., a retractable cover, etc.) moved to an open position, such as shown by the example arrow indicating an example direction of opening, via a motor or actuator (not shown) via instruction from a charging controller of the vehicle-based drone charging apparatus 110, to receive a load from an incoming drone. After deposit of the load, the movable cover 124 is moved to a closed position, via the motor or actuator (not shown), and locked via instruction from the charging controller. Following charging of the drone, this process is reversed to permit the drone to reacquire the load.

In some examples, pick-up trucks, such as the first, second and third example vehicles 102, 104, 106, include a retractable tonneau cover 126 controllable by the charging controller. In some examples, the charging controller, via a security manager of the vehicle-based drone charging apparatus 110, closes and locks the retractable tonneau cover 126 during charging of a drone to protect the drone from weather, damage or theft during charging.

In the illustrated example of FIG. 1, the first, second and third example vehicles 102, 104, 106 include example battery compartments 128 provided, by way of example, in the beds 112 of the vehicles. In some examples, the battery compartments 128 include fully-charged drone batteries available to be swapped out with depleted drone batteries, following purchase of the charged drone batteries or payment of rental fees for the use of a fully-charged drone battery (e.g., nickel metal hydride batteries, lithium ion batteries, or Li-ion polymer batteries, lithium polymer (LiPo) batteries, intelligent LiPo batteries, etc.) of any make, model, and capacity (e.g., 1000 mAh, 2200 mAh, 3300 mAh, 10000 mAh, etc.).

In some examples, the battery compartment 128 is electronically locked and unlocked, via the charging controller, to selectively provide access to an interior. In some examples, such as is shown with respect to the third example vehicle 106, the battery compartment 128 includes interior sub-compartments 129. The interior sub-compartments 129 may include, for example, a fully-charged drone replacement battery disposed therein for purchase or usage for a fee and, following payment of the appropriate fee, the charging controller electronically unlocks the associated sub-compartment at an appropriate time (e.g., following a verified arrival of the drone corresponding to the payment, following local entry of a code to unlock a specified sub-compartment by an operator of the drone, etc.). In some examples, the battery compartment 128 includes large capacity batteries 130 (e.g., vehicle batteries, deep-cycle batteries, marine batteries, traction battery (electric vehicle battery), lead-acid batteries, etc.) to charge drones through appropriate cables and connectors 132.

In the illustrated example of FIG. 1, the fourth example vehicle 108 is shown to include example solar cells 134 on the passenger compartment roof to provide power to one or more automobile systems, inclusive of the example charging device 120.

In the illustrated example of FIG. 1, the vehicle-based drone charging apparatus 110 of each of the first, second, third and fourth example vehicles 102, 104, 106, 108 broadcasts use information remotely and/or locally, respectfully. The vehicle-based drone charging apparatus 110 of each of the first, second, third and fourth vehicles 102, 104, 106, 108 communicates with an example cellular network 140 (e.g., cell sites, terrestrial communication antenna, etc.).

The use information may include, for example, location information (e.g., vehicle location data, etc.), fee information (e.g., a price/cost associated with a charging service, etc.), availability information (e.g., times at which the charging device is available for use, including locations associated with those times, etc.), charging device type information (e.g., whether the charging device is a charging pad or a docking station, drone size/weight capacity associated with the charging device, etc.), and charge rate information (e.g., whether charger is able to provide 1 C, 2 C, etc.).

The example cellular network 140, in turn, communicates with the Internet 145 and an example remote server 150 directly or through one or more intermediary communication devices (e.g., satellite, cell towers, switching center, T1 or T3 line, microwave antenna, etc.) and conveys the use information to the remote server 150.

FIG. 1 also shows an example drone operator 160 wirelessly controlling an example drone 175 via an example drone controller 172. The example drone operator 160 may select any of the available example charging devices 120 to charge the example drone 175 in whole or in part, for a fee, or to exchange a depleted battery for a charged battery from an example battery compartment 128. The example drone operator 160 is also shown to have an example mobile device 170 (e.g., cellular device, etc.) communicatively coupled to the example cellular network 140 and to the Internet 145 and example remote server 150, via the example cellular network 140 and any intermediary communication devices (e.g., satellite, cell towers, switching center, T1 or T3 line, microwave antenna, etc.).

Thus, in some examples, the vehicle-based drone charging apparatus 110 broadcast or otherwise transmit use information to a remote server 150, which receives use information from other vehicle-based drone charging apparatus and aggregates or otherwise organizes all use data. In some examples, in response to a request for use information received at the remote server 150 from an example mobile device 170, the remote server 150 broadcasts or otherwise transmits relevant use information to the example mobile device 170, such as information relevant to the location of the mobile device 170 or information responsive to a particular request for use information by the mobile device 170. Following receipt of the use information, the example mobile device 170 transmits a reservation request to the remote server 150. The reservation request may select a specific charging device 120 and/or selected vehicle, or may be unmatched. If the reservation request is unmatched, the remote server 150 performs a matching operation and returns reservation information to the example mobile device 170 identifying/recommending a charging device 120 and/or vehicle for charging of a specific drone. The example mobile device 170 transmits a matched reservation request to the remote server 150 (e.g., either based on a matching operation performed at the mobile device 170 or based on the remote server 150 matching operation and returning recommendation to mobile device 170). The example mobile device 170 also transmits payment information associated with the matched reservation request to the remote server 150. Although the above example relates to an example operator 160 using the example mobile device 170 to communicate with the remote server 150 via the cellular network 140, the example mobile device 170 could include a communication device borne by an automated drone. The remote server 150 verifies the payment information and confirms availability of the matched reservation request, transmitting a reservation confirmation to both the mobile device 170 and to the vehicle-based drone charging apparatus 110. The reservation confirmation includes pertinent information to coordinate and enable the charging transaction such as, but not limited to, time information (e.g., a reserved time for a charging session, etc.), authentication information (e.g., features and/or codes by which the drone may be authenticated by the vehicle-based drone charging apparatus 110, etc.) and validated payment information (e.g., credit card info, etc.).

Subsequent to the arranging of the charging transaction at the vehicle-based drone charging apparatus 110, the vehicle-based drone charging apparatus 110 detects the drone at the charging device 120. In some examples, the vehicle-based drone charging apparatus 110 then authenticates the drone based on authentication information included within the reservation confirmation and based on one or more features of the detected drone. In some examples, following a successful authentication, the vehicle-based drone charging apparatus 110 verifies the payment information or confirms that the remote server 150 has verified the payment information and, following a successful verification of the payment information, operatively couples the drone to the charging device 120 to charge the drone. In some examples, successful operative coupling in addition to one or more of successful authentication and/or successful payment info verification enables a drone charging session to commence.

In the example of FIG. 1, the vehicle-based drone charging apparatus 110 of the first, second, third and fourth vehicles 102, 104, 106, 108 broadcast use information to the example remote server 150 (e.g., a cloud server) via the example cellular network 140. The cellular network 140 may be a multi-cellular network that provides and/or enables connections and/or communications with, among and/or between different cellular service providers and/or carriers (e.g., Verizon®, AT&T®, Sprint®, T-Mobile®, etc.).

The use data transmitted to the remote server 150 via the cellular network 140 may include use information for the charging device 120. For example, the vehicle-based drone charging apparatus 110 of the first vehicle 102 of FIG. 1 may transmit use information to the remote server 150 via the cellular network 140 including location information (e.g., "Location 1" as shown in FIG. 1) associated with a location of the first vehicle 102, such as GPS coordinates, vehicle location on a map, or physical or electronic navigation markers. The vehicle-based drone charging apparatus 110 of the first vehicle 102 may transmit use information to the remote server 150 via the cellular network 140 including, for example, fee information associated with a cost for use of the example charging device 120 of the first vehicle 102, such as cost per mAh of charge. The vehicle-based drone charging apparatus 110 of the first vehicle 102 of FIG. 1 may transmit use information to the remote server 150 via the cellular network 140 including, for example, terms of use for the charging device 120 of the first vehicle 102, times of availability for use of one of the two charging devices 120 of the first vehicle 102, or vehicle movement information (e.g., between 12:00 and 1:00, the vehicle owner is going to run an errand and return, etc.).

As another example, the vehicle-based drone charging apparatus 110 of the second vehicle 104 of FIG. 1 may transmit use information to the remote server 150 via the cellular network 140 including location information associated with a location of the second vehicle 104 (e.g., "Location 2," as shown in FIG. 1), such as GPS coordinates, vehicle location on a map, or physical or electronic navigation markers. The vehicle-based drone charging apparatus 110 of the second vehicle 104 may transmit use information to the remote server 150 via the cellular network 140 including, for example, fee information associated with a cost for use of one of the charging devices 120 or use of the example deep-cycle batteries 130 (via cables and connectors 132) of the second vehicle 104, such as cost per mAh of charge for each of the charging devices 120 and the example deep-cycle batteries 130. The vehicle-based drone charging apparatus 110 of the second vehicle 104 may transmit use information to the remote server 150 via the cellular network 140 including, for example, terms of use for the charging device 120 of the second vehicle 104, times of availability for use of one of the five charging devices 120 of the second vehicle 104, or vehicle movement information.

As another example, the vehicle-based drone charging apparatus 110 of the third vehicle 106 of FIG. 1 may transmit use information to the remote server 150 via the cellular network 140 including location information associated with a location of the third vehicle 106 (e.g., "Location 3," as shown in FIG. 1), such as GPS coordinates, vehicle location on a map, or physical or electronic navigation markers. The vehicle-based drone charging apparatus 110 of the third vehicle 106 may transmit use information to the remote server 150 via the cellular network 140 including, for example, fee information associated with a cost for use of the charging device 120 of the third vehicle 106, or a sub-portion thereof (e.g., a fee per mAh of charge, a fee relative to a percentage of the charging device 120 occupied, etc.), or a cost for each battery in a sub-compartment 129 of the third vehicle 106. The vehicle-based drone charging apparatus 110 of the third vehicle 106 may transmit use information to the remote server 150 via the cellular network 140 including, for example, terms of use for the charging device 120 of the third vehicle 106, times of availability for use of charging device 120 of the third vehicle 106, or vehicle movement information.

As another example, the vehicle-based drone charging apparatus 110 of the fourth vehicle 108 of FIG. 1 may transmit use information to the remote server 150 via the cellular network 140 including location information associated with a location of the fourth vehicle 108 (e.g., "Location 4," as shown in FIG. 1), such as GPS coordinates, vehicle location on a map, or physical or electronic navigation markers. The vehicle-based drone charging apparatus 110 of the fourth vehicle 108 may transmit use information to the remote server 150 via the cellular network 140 including, for example, fee information associated with a cost for use of the charging device 120 of the fourth vehicle 108 (e.g., a fee per mAh of charge, etc.). The vehicle-based drone charging apparatus 110 of the fourth vehicle 108 may transmit use information to the remote server 150 via the cellular network 140 including, for example, terms of use for the charging device 120 of the fourth vehicle 108, times of availability for use of charging device 120 of the fourth vehicle 108, or vehicle movement information.

Figure 2:
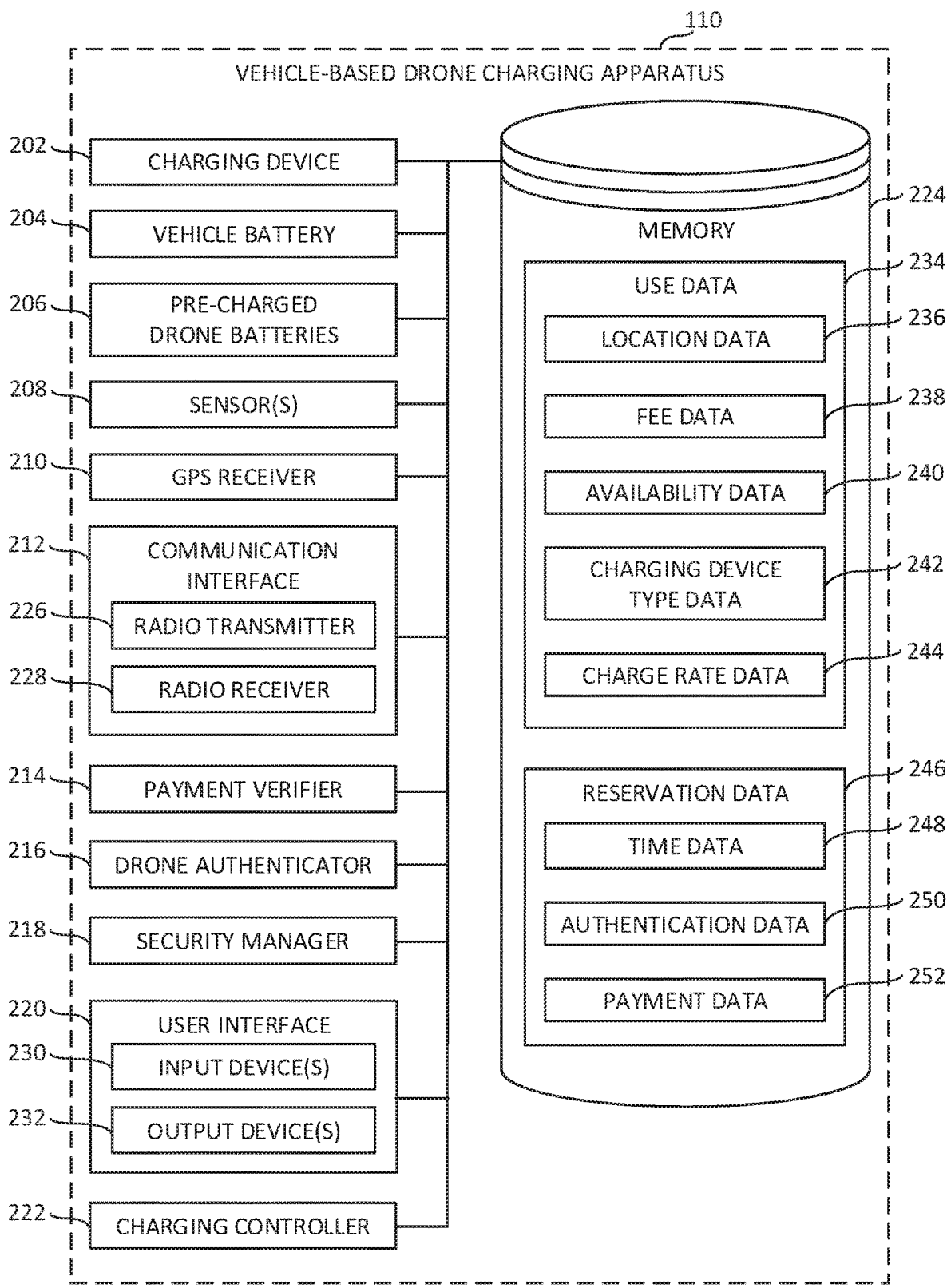
FIG. 2 is a block diagram of the example vehicle-based drone charging apparatus of FIG. 1 constructed in accordance with the teachings of this disclosure.

FIG. 2 is a block diagram of the example vehicle-based drone charging apparatus 110 of FIG. 1 constructed in accordance with the teachings of this disclosure. The block diagram of FIG. 2 may be used to implement the example vehicle-based drone charging apparatus 110 of any of the first, second, third and/or fourth example vehicles 102, 104, 106, 108 of FIG. 1. In the illustrated example of FIG. 2, the vehicle-based drone charging apparatus 110 includes an example charging device 202, an example vehicle battery 204, example pre-charged vehicle batteries 206, an example sensor 208, an example Global Positioning System (GPS) receiver 210, an example communication interface 212, an example payment verifier 214, an example drone authenticator 216, an example security manager 218, an example user interface 220, an example charging controller 222, and an example memory 224. However, other example implementations of the vehicle-based drone charging apparatus 110 may include fewer or additional structures.

The example charging device 202 of FIG. 2 includes, in some examples, a wireless charging device or a hardwired charging device (e.g., a physical docking station having leads and connectors to couple to a drone battery) to charge one or more types of drone batteries when a drone is operatively coupled thereto (e.g., when a drone is proximate to or contacting a wireless charging pad, etc.). The charging device 202 of FIG. 2 may be implemented as any of the charging devices 120 of FIG. 1 described above. In some examples, the charging device 202 includes a wireless power transfer (WPT) device or a near-field wireless charging device to wirelessly transmit energy from the power source (e.g., vehicle batteries, solar panel 134, etc.) to the depleted drone batteries. In some examples, this power transfer is conducted via magnetic fields using inductive coupling (e.g., inductive coupling, resonant inductive coupling, etc.) between coils of conductive material or via electric fields using capacitive coupling between conductive electrodes integrated with or attached to the drone (e.g., the drone 175 of FIG. 1) and a respective charging device 202 upon which the drone is disposed. In some examples, the charging device 202 includes a direct-contact charging pad having one or more conductive surfaces positioned to contact one or more conductors disposed in or about skids or landing gear of the drone. In other examples, the charging device 202 includes a plug-in charging device wherein an operator of the vehicle (e.g., 102 in FIG. 1), or an operator of the drone, is physically present and physically plugs in the drone to the charging device 202 to establish an electrical connection to effect charging. As is represented with respect to the example charging devices 120 in FIG. 1, the example charging device 202 may be positioned on any drone-accessible surface of the vehicle (e.g., bed, roof, hood, etc.) or extension or attachment thereto.

The example vehicle battery 204 of FIG. 2 provides a potential source of stored energy for charging of one or more drones using the charging device 202 of FIG. 2. The example vehicle battery 204 includes, in some examples, the above-noted batteries 130 (FIG. 1) disposed in a battery compartment 128 (FIG. 1), but also vehicle power sources (e.g., vehicle battery, electric vehicle (EV) power system, etc.). In some examples, the vehicle power source and power delivery is regulated (e.g., power optimization of electrical loads or subsystems, load prioritization, etc.) by an on-board vehicle power management to selectively deliver conditioned power, through a vehicle network, to the charging device 202 of FIG. 2.

The example pre-charged drone batteries 206 of FIG. 2 are provided, by way of example, in the example battery compartment 128 or example battery sub-compartments 129, and are available for purchase or are available for rent by an owner of a drone. The example pre-charged drone batteries 206 may include, for example, NiCd batteries, nickel metal hydride batteries, lithium ion batteries, or Li-ion polymer batteries, lithium polymer (LiPo) batteries or smart lithium polymer (LiPo) batteries. The pre-charged drone batteries 206 may include any make, model and capacity of battery (e.g., 1000 mAh, 2200 mAh, 3300 mAh, 10000 mAh, etc.).

The example sensor 208 of FIG. 2 senses, measures and/or detects a characteristic of an object (e.g., a drone), such as for example, a weight of an object placed on charging device 202 of FIG. 2. In some examples, the sensor(s) 208 include(s) a microphone, a capacitive sensor, an example photoelectric sensor, a piezocapactive sensor, a piezocapactive pressure sensor, a piezoelectric sensor, an infrared (IR) sensor, a photoswitch, a charge-coupled device (CCD) image sensor, a complementary metal-oxide-semiconductor (CMOS) image sensor, a photodetector, a pressure sensor, a load cell, a motion detector (optical, microwave, or acoustic sensor) or a proximity sensor. In some examples, the sensor 208 includes pressure sensitive elements in or under the charging device 202 of FIG. 2 to sense a weight of a drone thereupon. For example, such sensor(s) 208 include(s) a matrix pressure sensor (pressure sensor array), a force sensor, or a position sensor in one or more locations about the charging device 202 of FIG. 2. In some examples, the sensor 208 may be implemented as a load cell. Characteristics sensed, measured and/or detected by the sensor 208 may be associated with one or more time(s) (e.g., time stamped) at which the data was sensed, measured and/or detected by the sensor 208. Data sensed, measured and/or detected by the sensor 208 may be of any type, form and/or format, and may be stored in a computer-readable storage medium such as the example memory 224 described below.

The example GPS receiver 210 of FIG. 2 collects, acquires and/or receives data and/or one or more signal(s)

from one or more GPS satellite(s) (not shown). The data and/or signal(s) received by the GPS receiver 210 may include information from which the current position and/or location of a vehicle including the vehicle-based drone charging apparatus 110 (e.g., the first vehicle 102 of FIG. 1 including the vehicle-based drone charging apparatus 110 of FIG. 1) may be identified and/or derived, including for example, the current latitude and longitude of the vehicle. Vehicle location data identified and/or derived from the signal(s) collected and/or received by the GPS receiver 210 may be associated with one or more time(s) (e.g., time stamped) at which the data and/or signal(s) were collected and/or received by the GPS receiver 210. Vehicle location data identified and/or derived from the signal(s) collected and/or received by the GPS receiver 210 may be of any type, form and/or format, and may be stored in a computer-readable storage medium such as the example memory 224 described below.

The example communication interface 212 of FIG. 2 facilitates communication between the vehicle-based drone charging apparatus 110 of FIGS. 1 and/or 2 and external machines (e.g., the remote server 150 of FIGS. 1 and/or 3, the mobile device 170 of FIGS. 1 and/or 4) over a network (e.g., the cellular network 140 of FIG. 1). In the illustrated example of FIG. 2, the communication interface 212 includes an example radio transmitter 226 and an example radio receiver 228. In some examples, the example communication interface 212 includes a communication device (e.g., a GSM (Global System for Mobile communication) device, a vehicle modem, etc.) such as Ford Motor Company SYNC® Connect with a 4G LTE vehicle cellular modem and an AT&T network connection enabling the vehicle to communicate with services, remote systems or remote devices, such as an owner's smartphone, via the cellular network 140. The example communication interface 212 may include, for example, a Ford Motor Company vehicle-to-network (V2N) system, a vehicle-to-pedestrian (V2P) system, a vehicle-to-infrastructure (V2I) system, a vehicle-to-vehicle (V2V) system, a Bluetooth or other wireless adaptive frequency hopping (AFH) device (e.g., a Bluetooth Smart (Low Energy) device, etc.), a WiFi (Wireless Fidelity) or a WLAN (Wireless Local Network) communication system (e.g., an Institute of Electrical and Electronics Engineers' (IEEE) 802.11 system).

The example radio transmitter 226 of FIG. 2 transmits data and/or one or more signal(s) to the remote server 150 of FIGS. 1 and/or 3. In some examples, the data and/or signal(s) transmitted by the radio transmitter 226 to the remote server 150 of FIGS. 1 and/or 3, for example, is/are communicated via a network, such as the example cellular network 140 of FIG. 1. In some examples, the radio transmitter 226 may transmit use information (e.g., the use data 234 of FIG. 2) including one or more of vehicle location information (e.g., the location data 236 of FIG. 2), fee information (e.g., the fee data 238 of FIG. 2), availability information (e.g., the availability data 240 of FIG. 2), charging device type information (e.g., the charging device type data 242 of FIG. 2), and/or charge rate information (e.g., the charge rate data 244 of FIG. 2). Data corresponding to the signal(s) to be transmitted by the radio transmitter 226 may be of any type, form and/or format, and may be stored in a computer-readable storage medium such as the example memory 224 described below.

In some examples, the use information includes vehicle location information (e.g., GPS coordinates, map location, navigation markers, etc.) and fee information for using the charging device 202 (e.g., terms of use, charging fee information, charging times, prices for battery exchanges, etc.). For example, the first vehicle 102 of FIG. 1 broadcasts to the server 150, via the cellular network 140, the vehicle's location (e.g., 42.3152428 (latitude), −83.210479 (longitude)) and use information (e.g., two charging devices 120 are available from 9 AM-3 PM, the charging devices 120 providing charging at 48 cents per kWh, and the battery compartment 128 includes 6 charged 12000 MAH 15 C LiPo battery packs with AS150 and XT150 plugs that are available to be purchase for $275 each or swapped for a depleted drone battery for a fee commensurate with the difference between a market value of the depleted drone battery and the set purchase price for a selected charged battery pack, etc.). The location information for a respective vehicle need not be a current location or even a static location. For example, a vehicle may broadcast a prospective schedule or a route including one or more locations at which a drone could embark or disembark. Thus, an automated drone (e.g., a delivery drone, a commercial drone, etc.) may take advantage of a prospective movement of a vehicle providing a charging service to convey the drone closer to an intended destination or waypoint, thereby minimizing flight time.

The example radio receiver 228 of FIG. 2 collects, acquires and/or receives data and/or one or more signal(s) from the remote server 150 of FIGS. 1 and/or 3. In some examples, the data and/or signal(s) received by the radio receiver 228 from the remote server 150 is/are communicated via a network, such as the example cellular network 140 of FIG. 1. In some examples, the radio receiver 228 may receive data and/or signal(s) corresponding to a reservation confirmation and/or reservation information (e.g., the reservation data 246 of FIGS. 2-4) including time information (e.g., the time data 248 of FIGS. 2-4), authentication information (e.g., the authentication data 250 of FIGS. 2-4), and/or payment information (e.g., the payment data 252 of FIGS. 2-4). Data identified and/or derived from the signal(s) collected and/or received by the radio receiver 228 may be of any type, form and/or format, and may be stored in a computer-readable storage medium such as the example memory 224 described below.

The example payment verifier 214 of FIG. 2 verifies that the obtained/received payment information is valid or verifies data received via the radio receiver 228 from any source (e.g., the remote server 150 of FIGS. 1 and/or 3, a payment clearinghouse, etc.) establishing that payment information is valid and/or that payment has been made, or that payment for an amount corresponding to an expecting charging service is pre-authorized. For example, the payment verifier 214 authenticates payment information provided with or subsequent to a drone charging request from a drone or a drone operator (e.g., 160, FIG. 1), such as payment authentication through a transaction processing clearinghouse, and by providing the charging controller 222 with an authentication of payment information for use of the charging device 202. This information is usable by the charging controller 222, for example, to enable charging of a drone using the charging device 202 following receipt of payment authentication or to deny charging absent receipt of such payment authentication. Particularly for a high value unattended transaction, such as a purchase of a battery, payment authorization through the payment verifier 214 can be used by the charging controller 222, to electronically unlock a corresponding locked compartment of a battery compartment (e.g., 129 in FIG. 1) at a relevant time (e.g., following arrival of the drone, etc.) or to broadcast to the operator of a drone a one-time use code to permit the operator to open a corresponding locked sub-compartment 129 of a battery compartment 128 and retrieve the purchased or rented battery. In some examples, prior to broadcasting by the remote server 150 of FIGS. 1 and/or 3 of the relevant use information to the drone or to the operator of the drone, a pre-payment authorization may be required. This request for pre-payment authorization could be included, for example, in use data 234 broadcast to the remote server 150 of FIGS. 1 and/or 3. Pre-payment authorization could include, for example, a broadcast of payment information received by the remote server 150 of FIGS. 1 and/or 3 from the drone or operator of the drone to a clearinghouse for pre-approval. In some examples, a successful pre-approval via the payment verifier 214 is used as a pre-condition for provision of a charging service, such as charging of the drone using the charging device 202.

The example drone authenticator 216 of FIG. 2 verifies that the drone at the charging device matches the drone associated with a reservation confirmation. In some examples, the example drone authenticator 216 matches one or more features (e.g., size, shape, weight, a reservation confirmation code, etc.) of the drone relative to the authentication data 250 contained within reservation data 246. In some examples, the authentication data 250 obtained from the drone and/or the drone operator is used by the drone authenticator 216 to authenticate an identity of the drone prior to enabling use of the charging device 202. By way of example, the authentication data 250 can include any physical or electronic information needed to identify the drone such as, but not limited to a make and model of the drone, a weight of the drone, visual characteristics of the drone (e.g., a coloration of the drone, a geometry of the drone, markings on the drone, etc.). To illustrate, when a drone arrives at the charging device 202, one or more sensor(s) 208 of the vehicle-based drone charging apparatus 110 are able to permit authentication of an identity of the drone prior to initiating the charging service. For example, a first one of the sensor(s) 208 may verify whether the weight of the drone is within a predefined range (e.g., +/−5 grams, +/10 grams, etc.) of an expected weight, while a second one of the sensor(s) 208 may image the drone (or a portion thereon) to enable the drone authenticator 216 to identify the drone via the visual characteristics of the drone. In another example, the drone authenticator 216 authenticates an identify of the drone via a wireless pairing of the drone to the charging controller 222, in which identifying authentication data 250 is provided by the drone.

The example security manager 218 of FIG. 2 is used to selectively enable vehicle security features to provide security during charging of a drone. For example, the security manager 218 activates one or more alarms (e.g., an audible alarm, a visual alarm such as flashing lights, an electronic alarm such as a text message to a vehicle owner and/or a drone operator, etc.) when the charging device 202 is approached. The example security manager 218 may utilize vehicle security features (e.g., door intrusion alarm, glass breakage alarm, etc.) and/or charging device 202 features (e.g., a camera registering a presence of a person, a sensor 208 registering a removal of a drone, via a zero weight indication from a load cell, prior to a substantial completion of charging by the charging controller, etc.). In other examples, the security manager 218 monitors the opening, closing, locking and unlocking of various vehicle compartments (e.g., battery compartment 128, sub-compartments 129, etc.) to enable access to the drone, the charging device 202 and/or the pre-charged drone batteries. In some examples, an automated and lockable tonneau cover is closed and locked by the security manager 218 during charging of a drone to protect the drone from weather, damage or theft during charging. Following charging, the security manager 218 unlocks and opens the tonneau cover to permit egress of the drone.

The example user interface 220 of FIG. 2 facilitates interactions and/or communications between an end user and the vehicle-based drone charging apparatus 110 of FIGS. 1 and/or 2. The user interface 220 includes one or more input device(s) 230 via which the user may input information and/or data to the vehicle-based drone charging apparatus 110. For example, the input device(s) 230 may be a button, a microphone, and/or a touchscreen that enable(s) the user to convey data and/or commands to the vehicle-based drone charging apparatus 110. The user interface 220 of FIG. 2 also includes one or more output device(s) 232 via which the user interface 220 and/or, more generally, the vehicle-based drone charging apparatus 110 presents information and/or data in visual and/or audible form to the user. For example, the output device(s) 232 may include a light emitting diode, a touchscreen, and/or a liquid crystal display for presenting visual information, and/or a speaker for presenting audible information. Data and/or information that is presented and/or received via the user interface 220 may be of any type, form and/or format, and may be stored in a computer-readable storage medium such as the example memory 224 described below.

The example charging controller 222 of FIG. 2 may be implemented by a semiconductor device such as a processor, microprocessor, controller or microcontroller. The charging controller 222 manages and/or controls the operation of the vehicle-based drone charging apparatus 110 of FIGS. 1 and/or 2 based on data, information and/or one or more signal(s) obtained and/or accessed by the charging controller 222 from one or more of the charging device 202, the vehicle battery 204, the sensor 208, the GPS receiver 210, the communication interface 212, the payment verifier 214, the drone authenticator 216, the security manager 218, the user interface 220 and/or the memory 224 of FIG. 2, and/or based on data, information and/or one or more signal(s) provided by the charging controller 222 to one or more of the charging device 202, the vehicle battery 204, the communication interface 212, the payment verifier 214, the drone authenticator 216, the security manager 218 and/or the user interface 220.

The charging controller 222 of FIG. 2 manages the charging of drones coupled to the charging device 202 of FIG. 2 and performs functions enabling charging of the drone by the charging device 202. By way of example, the charging controller 222 determines, for a particular battery to be charged (e.g., a 2200 mAh LiPo cell), an appropriate charging rate (e.g., a 1 C charging rate, a 2 C charging rate, etc.). In some examples, the charging controller 222 ensures, for example, proper LiPo battery balance during charging and discharging to maintain substantially the same voltage across all cells in a multi-cell battery at all times (e.g., cell deviation less than about 5 mV-10 Mv). To illustrate, a charging rate of 1 C indicates a charging rate at 2.2 A for an example 2200 mAh LiPo battery and a charging rate at 5 A for an example 5000 mAh LiPo battery. A particular battery may be rated at a charge rate higher than 1 C and, in some examples, the charging controller 222 provides a charging rate commensurate with the battery rating (e.g., 15 A for a 3 C 5000 mAh LiPo battery, etc.). In some examples, the charging controller 222 balances the drone battery (e.g., LiPo battery) during charging so as to equalize a voltage of each cell in a battery. In some examples, the charging controller 222 controls the charge rate or voltage until the LiPo attains a peak charge (e.g., 4.2 v per cell in a battery pack), at which point the example charging controller 222 disengages the charging device 202 from the drone.

In some examples, the charging controller 222 of FIG. 2 may enable charging of the drone by the charging device 202 only following satisfaction of one or more prerequisite conditions.

In some examples, the charging controller 222 of FIG. 2 operatively couples the drone to the charging device 202 via a wireless pairing of the drone to the charging device 202 and/or to the vehicle associated with the charging device 202 and, responsive to such wireless pairing, enable charging of the drone via the charging device 202. For example, the charging controller 222 of FIG. 2 may condition the charging of a drone via the charging device 202 upon a confirmation that the operative coupling was successfully performed.

In some examples, the charging controller 222 of FIG. 2 may further condition the charging upon a confirmation that the drone has been successfully authenticated. For example, the vehicle-based drone charging apparatus 110 includes one or more sensor(s) 208 to sense one or more variables associated with a drone charging process and to output the sensor information to the charging controller 222 for comparison to stored authentication data 250. For example, the sensor 208 may measure a weight of a drone on the charging device 202 and pass this information to the charging controller 222, which accesses the drone weight for the charging transaction from the stored authentication data 250 to compare to the measured weight. If there is a match or a substantial correlation (e.g., +/−2 grams, +/−5 grams, etc.) the charging controller 222 then enables charging of the drone operatively coupled to the charging device 202. For example, if a drone expected to be received at the charging device 202 is known to have a weight of about 1280 grams, via the authentication data 250 stored in memory 224, a sensor 208 outputting a reading of about 1280 grams can be used by the charging controller 222 to verify that the correct drone has been operatively associated to the charging device 202. The sensor or sensors 208 used by the charging controller 222 to authenticate a drone and to correspondingly, in some examples, enable charging of the drone via the charging device 202 may include any sensor able to provide a confirmation of authentication data 250 received as part of the reservation data 246 and stored in the memory 224 including, but not limited to a make and model of the drone, a weight of the drone, a skid type, a color, markings on the drone or an electronic signature of the drone.

In some examples, the charging controller 222 of FIG. 2 enables charging of the drone via the example charging device 120 in response to detecting a verification of payment information or data 252 corresponding to the cost for use of the charging device. Detecting a verification of payment information 252 may include, for example, receipt and confirmation of a payment authentication received from a transaction processing clearinghouse, a payment authentication from a transaction processing clearinghouse received via the example remote server 150, a payment authentication from a payment processor, or other manner of payment authorization or verification of a transfer of funds. The charging controller 222 enables charging of a drone using the charging device 202 following receipt of the payment authentication 252. In some examples, where the use of the charging device includes a high value unattended transaction, such as a purchase of a battery, the detecting of a verification of payment information is used by the example charging controller 222 to electronically unlock a corresponding locked compartment of an example battery compartment 128 or to transmit to example operator 160 (e.g., via the example remote server 150, via the example cellular network 140, etc.) a one-time use code to open a corresponding locked compartment of a battery sub-compartment (e.g., 129). The operator of the drone is then enabled by the charging controller 222 to retrieve the purchased battery from the corresponding locked compartment of the battery sub-compartment (e.g., 129) following entry of the one-time use code.

In some examples, if any of the above authentications are unsuccessful, the charging controller 222 does not enable charging of the drone via the charging device 202. In some examples, multiple authentications are required prior to enabling of the charging of the drone via the charging device 202 by the charging controller 222. To illustrate, in one example a charging controller 222 requires a first authentication of the drone via sensor 208, a second authentication of the drone via a verification of payment information 252 by the charging controller 222, and a third verification that the drone is operatively coupled to the charging device 202.

The example memory 224 of FIG. 2 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the memory 224 may be stored in any file and/or data structure format, organization scheme, and/or arrangement. In some examples, the memory 224 stores use information and/or data (e.g., the use data 234 of FIG. 2). In some examples, the use information and/or data includes vehicle location information and/or data (e.g., the location data 236 of FIG. 2). In some examples, the use information and/or data includes fee information and/or data (e.g., the fee data 238 of FIG. 2). In some examples, the use information and/or data includes availability information and/or data (e.g., the availability data 240 of FIG. 2). In some examples, the use information and/or data includes charging device type information and/or data (e.g., the charging device type data 242 of FIG. 2). In some examples, the use information and/or data includes charge rate information and/or data (e.g., the charge rate data 244 of FIG. 2). In some examples, the memory 224 stores reservation information and/or data (e.g., the reservation data 246 of FIGS. 2-4). In some examples, the reservation information and/or data includes time information and/or data (e.g., the time data 248 of FIGS. 2-4). In some examples, the reservation information and/or data includes authentication information and/or data (e.g., the authentication data 250 of FIGS. 2-4). In some examples, the reservation information and/or data includes payment information and/or data (e.g., the payment data 252 of FIGS. 2-4). The memory 224 is accessible to the example charging device 202, the example sensor 208, the example GPS receiver 210, the example communication interface 212, the example payment verifier 214, the example drone authenticator 216, the example security manager 218, the example user interface 220, and the example charging controller 222 of FIG. 2, and/or, more generally, to the example vehicle-based drone charging apparatus 110 of FIGS. 1 and/or 2.

While an example manner of implementing the example vehicle-based drone charging apparatus 200 is illustrated in FIG. 2, one or more of the elements, processes and/or devices illustrated in FIG. 2 may be combined, divided, re-arranged, omitted, eliminated and/or implemented in any other way. Further, the example charging device 202, the example sensor 208, the example GPS receiver 210, the example communication interface 212, the example payment verifier 214, the example drone authenticator 216, the example security manager 218, the example user interface 220, the example charging controller 222, and/or the example memory 224 of FIG. 2 may be implemented by hardware, software, firmware and/or any combination of hardware, software and/or firmware. Thus, for example, any of the example charging device 202, the example sensor 208, the example GPS receiver 210, the example communication interface 212, the example payment verifier 214, the example drone authenticator 216, the example security manager 218, the example user interface 220, the example charging controller 222, and/or the example memory 224 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example charging device 202, the example sensor 208, the example GPS receiver 210, the example communication interface 212, the example payment verifier 214, the example drone authenticator 216, the example security manager 218, the example user interface 220, the example charging controller 222, and/or the example memory 224 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example vehicle-based drone charging apparatus 110 of FIGS. 1 and/or 2 may include one or more elements, processes and/or devices in addition to, or instead of, those illustrated in FIG. 2, and/or may include more than one of any or all of the illustrated elements, processes and devices.

Figure 3:
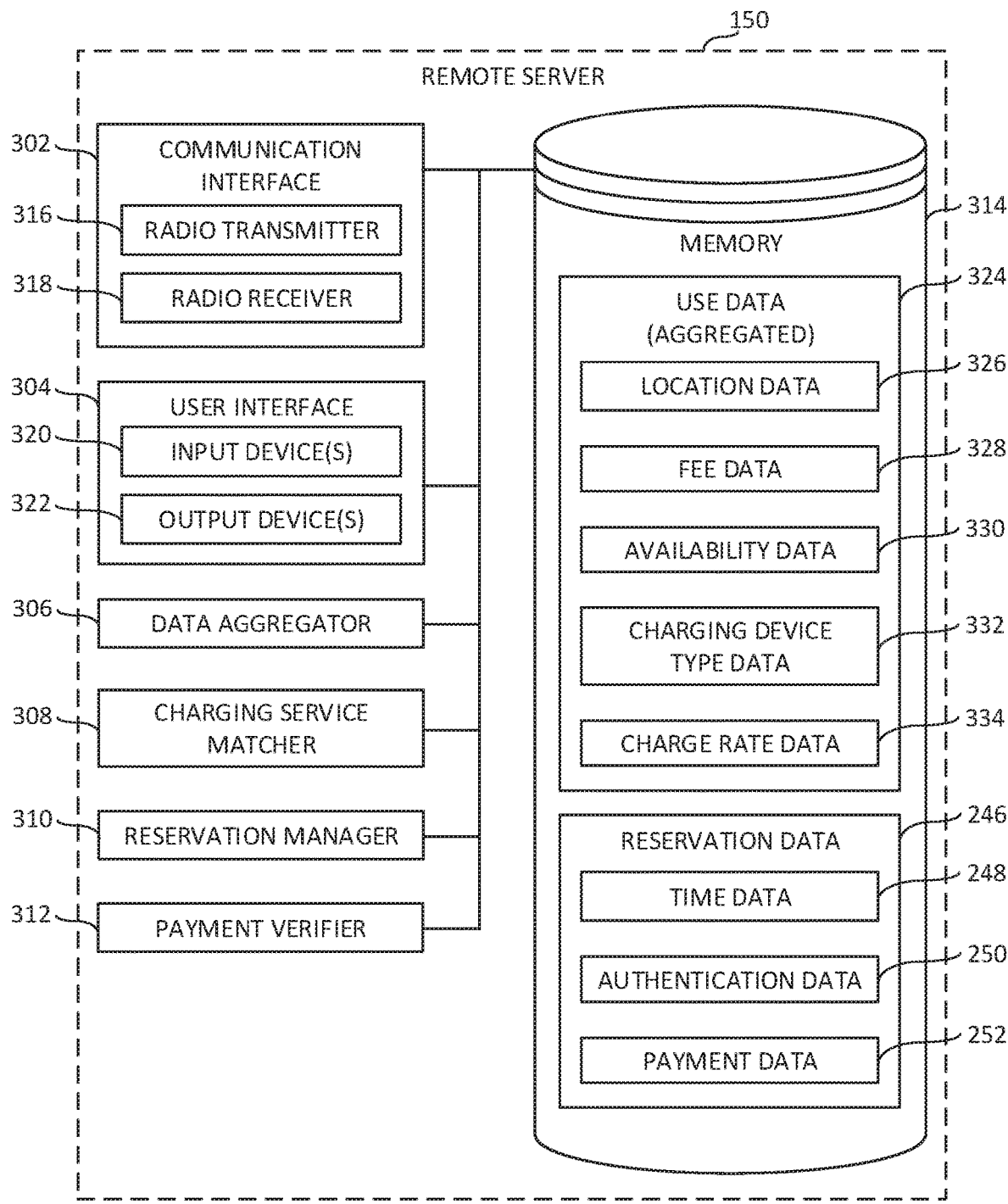
FIG. 3 is a block diagram of the example remote server of FIG. 1 constructed in accordance with the teachings of this disclosure.

FIG. 3 is a block diagram of the example remote server 150 of FIG. 1 constructed in accordance with the teachings of this disclosure. In the illustrated example of FIG. 3, the remote server 150 includes an example communication interface 302, an example user interface 304, an example data aggregator 306, an example charging service matcher 308, an example reservation manager 310, an example payment verifier 312, and an example memory 314. However, other example implementations of the remote server 150 may include fewer or additional structures.

The example communication interface 302 of FIG. 3 facilitates communication between the remote server 150 of FIGS. 1 and/or 3 and external machines (e.g., the vehicle-based drone charging apparatus 110 of FIGS. 1 and/or 2 and/or the mobile device 170 of FIGS. 1 and/or 4) over a network (e.g., the cellular network 140 of FIG. 1). In the illustrated example of FIG. 3, the communication interface 302 includes an example radio transmitter 316 and an example radio receiver 318.

The example radio transmitter 316 of FIG. 3 transmits data and/or one or more signal(s) to the vehicle-based drone charging apparatus 110 of FIGS. 1 and/or 2 and/or the mobile device 170 of FIGS. 1 and/or 4. In some examples, the data and/or signal(s) transmitted by the radio transmitter 316 is/are communicated via a network such as the example cellular network 140 of FIG. 1. In some examples, the radio transmitter 316 may transmit aggregated use information (e.g., the aggregated use data 324 of FIG. 3) including one or more of aggregated vehicle location information (e.g., the aggregated location data 326 of FIG. 3), aggregated fee information (e.g., the aggregated fee data 328 of FIG. 3), aggregated availability information (e.g., the aggregated availability data 330 of FIG. 3), aggregated charging device type information (e.g., the aggregated charging device type data 332 of FIG. 3), and/or aggregated charge rate information (e.g., the aggregated charge rate data 334 of FIG. 3). In some examples, the radio transmitter 316 may transmit a reservation confirmation and/or reservation information (e.g., the reservation data 246 of FIGS. 2-4) including time information (e.g., the time data 248 of FIG. 2-4), authentication information (e.g., the authentication data 250 of FIG. 2-4), and/or payment information (e.g., the payment data 252 of FIG. 2-4). Data corresponding to the signal(s) to be transmitted by the radio transmitter 316 may be of any type, form and/or format, and may be stored in a computer-readable storage medium such as the example memory 314 described below.

The example radio receiver 318 of FIG. 3 collects, acquires and/or receives data and/or one or more signal(s) from the vehicle-based drone charging apparatus 110 of FIGS. 1 and/or 2 and/or the mobile device 170 of FIGS. 1 and/or 4. In some examples, the data and/or signal(s) received by the radio receiver 318 is/are communicated via a network such as the example cellular network 140 of FIG. 1. In some examples, the radio receiver 318 may receive data and/or signal(s) corresponding to use information (e.g., the use data 234 of FIG. 2) including one or more of vehicle location information (e.g., the location data 236 of FIG. 2), fee information (e.g., the fee data 238 of FIG. 2), availability information (e.g., the availability data 240 of FIG. 2), charging device type information (e.g., the charging device type data 242 of FIG. 2), and/or charge rate information (e.g., the charge rate data 244 of FIG. 2). In some examples, the radio receiver 318 may receive data and/or signal(s) corresponding to a reservation request and/or reservation information (e.g., the reservation data 246 of FIGS. 2-4) including time information (e.g., the time data 248 of FIG. 2-4), authentication information (e.g., the authentication data 250 of FIG. 2-4), and/or payment information (e.g., the payment data 252 of FIG. 2-4). Data identified and/or derived from the signal(s) collected and/or received by the radio receiver 318 may be of any type, form and/or format, and may be stored in a computer-readable storage medium such as the example memory 314 described below.

The example user interface 304 of FIG. 3 facilitates interactions and/or communications between an end user and the remote server 150 of FIGS. 1 and/or 3. The user interface 304 includes one or more input device(s) 320 via which the user may input information and/or data to the remote server 150. For example, the input device(s) 320 may be a button, a microphone, and/or a touchscreen that enable(s) the user to convey data and/or commands to the remote server 150. The user interface 304 of FIG. 3 also includes one or more output device(s) 322 via which the user interface 304 and/or, more generally, the remote server 150 presents information and/or data in visual and/or audible form to the user. For example, the output device(s) 322 may include a light emitting diode, a touchscreen, and/or a liquid crystal display for presenting visual information, and/or a speaker for presenting audible information. Data and/or information that is presented and/or received via the user interface 304 may be of any type, form and/or format, and may be stored in a computer-readable storage medium such as the example memory 314 described below.

The example data aggregator 306 of FIG. 3 aggregates or organizes use information received via the various communication interfaces of the vehicle-based drone charging apparatus 110 of FIGS. 1 and/or 2. The example data aggregator 306 stores the use data 234 (use information) and/or the reservation data 246 (reservation information) in a manner facilitating utilization by persons (e.g., drone operators, etc.) or computers or processors (e.g., automated drone, mobile device 170, remote server 150, etc.). By way of example, the use data 234 and/or the reservation data 246 may be aggregated in list, a table, a matrix, or an addressable data set.

The example charging service matcher 308 of FIG. 3 accesses the example data aggregator 306 to analyze the use data 234 and the reservation data 246 to determine if a match may be made as between a charging device 202 (via the use data 234) and a drone (via the reservation data 246).

In some examples, the charging service matcher 308 of FIG. 3 compares use data (e.g., the aggregated use data 324 of FIG. 3) and reservation data 246 (e.g., a request to charge a drone, a general location in which the charging of the drone is desired to occur, etc.) against an initial criteria, such as a location. For example, an initial determination may include identifying locations of all charging devices 120 within a selected range of a location of the drone (e.g., within an operation range of the drone, within a remaining flight envelope of the drone, etc.), locations of all charging devices 120 within a selected range of a location of the mobile device 170, or locations of all charging devices 120 within a selected range of a location specified in the reservation data 246, which may not be a current location of a drone. In some examples, charging devices 120 outside of the operational range of the drone may be excluded from consideration. Any charging device(s) 120 determined by the example charging service matcher 308 to be within an operational range of the drone may then be further considered for additional degrees of matching between the use data and the reservation data. Alternatively, the example charging service matcher 308 may compare every record in the use data to every record in the reservation data to determine matches.

In some examples, the charging service matcher 308 of FIG. 3 concurrently or subsequently determines whether or not the identified locations of all charging devices 120 within a selected range of a location of the drone, mobile device 170, or location specified in the reservation data 246 also satisfy a time or range of times specified in the reservation data 246 (e.g., immediately, within 5 minutes, within 30 minutes, within a specific range of times, etc.). This comparison would eliminate, for example, charging devices 120 which may be within range of a selected location specified for the charging service to be performed, but would not be within that range of the selected location at a time at which the charging service is required to be performed.

In some examples, a further determination by the charging service matcher 308 of FIG. 3 may include evaluation of the received use data (e.g., an availability of one or more charging devices, location information for the vehicle, a size of the charging devices, a size of a drone that may be accommodated, a weight of a drone that may be accommodated, a type or types of charging devices available, battery purchase options, battery swapping options, battery rental options, etc.) to determine which of the potentially available charging devices are, in fact, usable by the drone and consistent with the reservation data 246. As a further refinement, a determination of available charging devices 120 that are usable may be parsed into available charging devices 120 able to provide, for example, a desired charge rate capability (e.g., the rate(s) at which the charging device can safely charge the drone) or other charging features (e.g., balancing features, etc.).

In some examples, a further determination by the charging service matcher 308 of FIG. 3 may include, as to usable charging device(s) 120 within an operation range of the drone, evaluation of the received use information (e.g., fee information) to determine which of the usable charging device(s) 120 is to be selected to provide the charging service, such as based on a cost of a charging service or a battery swap service. Acceptable fees, or ranges of fees, may be specified in the reservation data 246. In other examples, where the reservation data 246 may not include a pre-approved acceptable fee or range of acceptable fees, the example charging service matcher 308 is to communicate with the mobile device 170 of FIGS. 1 and/or 4 via the cellular network 140 to verify an acceptance of fee information for one or more selected matching charging device(s) 120.

The example reservation manager 310 of FIG. 3 is to handle the reservation requests and reservation data 246 received from the mobile device 170 of FIGS. 1 and/or 4 and is to arrange reservations between a matching drone and a matching charging device 120 identified by the example charging service matcher 308. Following the matching of a charging device 120 and a drone, the example reservation manager 310 broadcasts the use data 234 (e.g., the vehicle location, the vehicle coordinates, the vehicle characteristics such as make, model, color, etc.) to the drone or to the operator of the drone to permit the drone, or to the operator of the drone, to navigate the drone to the charging device 120. In some examples, the broadcasting is performed via the communication interface 302 of the remote server 150. In some examples, the example reservation manager 310 enables the respective charging device 120 to itself broadcast to the matched drone the relevant use data 234, via vehicle communication interface 212 of FIG. 2.

The example payment verifier 312 of FIG. 3 is to verify that the received payment data 252 is valid. In some examples, the example payment verifier 312 uses the payment data 252 to conduct a payment verification authorization, such as by broadcasting the payment data 252, via the communication interface 302, to a clearinghouse for pre-approval. The pre-approval may include, for example, confirmation that the payment information is valid and/or that payment has been made, or that payment for an amount corresponding to an expecting charging service is authorized. In some examples, following payment authorization, the example payment verifier 312 then broadcasts payment data 252, including the pre-authorization, to the respective charging device 120. In some examples, the example payment verifier 312 broadcasts payment data 252 to the respective charging device 120 and the charging device 120 is to conduct a payment verification authorization, such as by broadcasting the payment data 252, via the communication interface 212, to a clearinghouse for pre-approval.

The example memory 314 of FIG. 3 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the memory 314 may be stored in any file and/or data structure format, organization scheme, and/or arrangement. In some examples, the memory 314 stores use information and/or data (e.g., the use data 234 of FIG. 2). In some examples, the use information and/or data includes vehicle location information and/or data (e.g., the location data 236 of FIG. 2). In some examples, the use information and/or data includes fee information and/or data (e.g., the fee data 238 of FIG. 2). In some examples, the use information and/or data includes availability information and/or data (e.g., the availability data 240 of FIG. 2). In some examples, the use information and/or data includes charging device type information and/or data (e.g., the charging device type data 242 of FIG. 2). In some examples, the use information and/or data includes charge rate information and/or data (e.g., the charge rate data 244 of FIG. 2). In some examples, the memory 314 stores aggregated use information and/or data (e.g., the aggregated use data 324 of FIGS. 3 and 4). In some examples, the aggregated use information and/or data includes aggregated vehicle location information and/or data (e.g., the aggregated location data 326 of FIGS. 3 and 4). In some examples, the aggregated use information and/or data includes aggregated fee information and/or data (e.g., the aggregated fee data 328 of FIGS. 3 and 4). In some examples, the aggregated use information and/or data includes aggregated availability information and/or data (e.g., the aggregated availability data 330 of FIGS. 3 and 4). In some examples, the aggregated use information and/or data includes aggregated charging device type information and/or data (e.g., the aggregated charging device type data 332 of FIGS. 3 and 4). In some examples, the aggregated use information and/or data includes aggregated charge rate information and/or data (e.g., the aggregated charge rate data 334 of FIGS. 3 and 4). In some examples, the memory 314 stores a reservation confirmation and/or reservation information and/or data (e.g., the reservation data 246 of FIGS. 2-4). In some examples, the reservation information and/or data includes time information and/or data (e.g., the time data 248 of FIGS. 2-4). In some examples, the reservation information and/or data includes authentication information and/or data (e.g., the authentication data 250 of FIGS. 2-4). In some examples, the reservation information and/or data includes payment information and/or data (e.g., the payment data 252 of FIGS. 2-4). The memory 314 is accessible to the example communication interface 302, the example user interface 304, the example data aggregator 306, the example charging service matcher 308, the example reservation manager 310 and the example payment verifier 312 of FIG. 3, and/or, more generally, to the example remote server 150 of FIG. 3.

While an example manner of implementing the example remote server 150 is illustrated in FIG. 3, one or more of the elements, processes and/or devices illustrated in FIG. 3 may be combined, divided, re-arranged, omitted, eliminated and/or implemented in any other way. Further, the example communication interface 302, the example user interface 304, the example data aggregator 306, the example charging service matcher 308, the example reservation manager 310, the example payment verifier 312 and/or the example memory 314 of FIG. 3 may be implemented by hardware, software, firmware and/or any combination of hardware, software and/or firmware. Thus, for example, any of the example communication interface 302, the example user interface 304, the example data aggregator 306, the example charging service matcher 308, the example reservation manager 310, the example payment verifier 312 and/or the example memory 314 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 302, the example user interface 304, the example data aggregator 306, the example charging service matcher 308, the example reservation manager 310, the example payment verifier 312 and/or the example memory 314 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example remote server 150 of FIGS. 1 and/or 3 may include one or more elements, processes and/or devices in addition to, or instead of, those illustrated in FIG. 3, and/or may include more than one of any or all of the illustrated elements, processes and devices.

Figure 4:
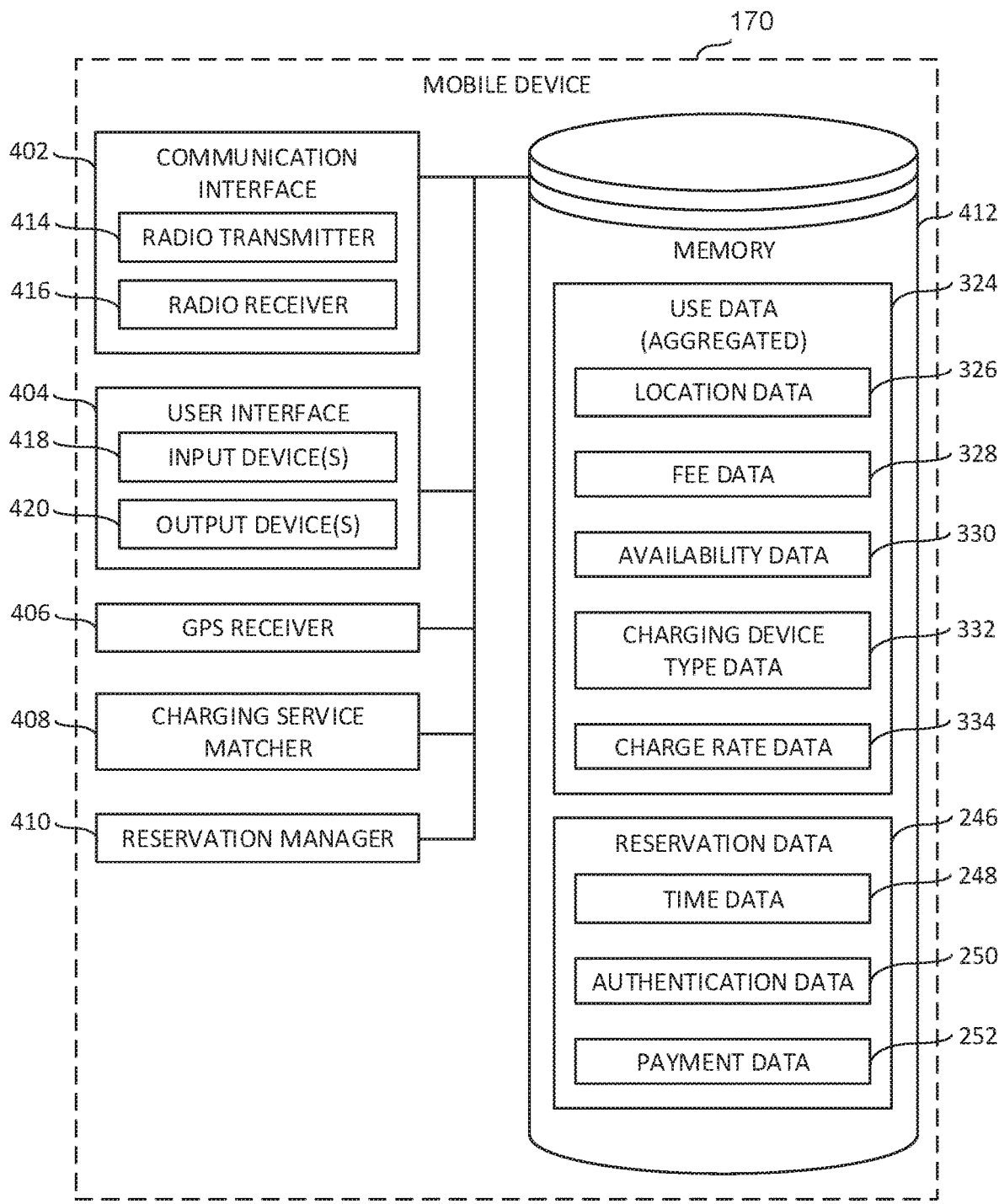
FIG. 4 is a block diagram of the example mobile device of FIG. 1 constructed in accordance with the teachings of this disclosure.

FIG. 4 is a block diagram of the example mobile device 170 of FIG. 1 constructed in accordance with the teachings of this disclosure. In the illustrated example of FIG. 3, the mobile device 170 includes an example communication interface 402, an example user interface 404, an example GPS receiver 406, an example charging service matcher 408, an example reservation manager 410, and an example memory 412. However, other example implementations of the mobile device 170 may include fewer or additional structures.

The example communication interface 402 of FIG. 4 facilitates communication between the mobile device 170 of FIGS. 1 and/or 4 and external machines (e.g., the remote server 150 of FIGS. 1 and/or 3) over a network (e.g., the cellular network 140 of FIG. 1). In the illustrated example of FIG. 4, the communication interface 402 includes an example radio transmitter 414 and an example radio receiver 416.

The example radio transmitter 414 of FIG. 4 transmits data and/or one or more signal(s) to the remote server 150 of FIGS. 1 and/or 3. In some examples, the data and/or signal(s) transmitted by the radio transmitter 414 is/are communicated via a network such as the example cellular network 140 of FIG. 1. In some examples, the radio transmitter 414 may transmit a request for aggregated use information (e.g., the aggregated use data 324 of FIGS. 3 and 4) including one or more of aggregated vehicle location information (e.g., the aggregated location data 326 of FIGS. 3 and 4), aggregated fee information (e.g., the aggregated fee data 328 of FIGS. 3 and 4), aggregated availability information (e.g., the aggregated availability data 330 of FIGS. 3 and 4), aggregated charging device type information (e.g., the aggregated charging device type data 332 of FIGS. 3 and 4), and/or aggregated charge rate information (e.g., the aggregated charge rate data 334 of FIGS. 3 and 4). In some examples, the radio transmitter 414 may a reservation request and/or reservation information (e.g., the reservation data 246 of FIGS. 2-4) including time information (e.g., the time data 2448 of FIG. 2-4), authentication information (e.g., the authentication data 250 of FIG. 2-4), and/or payment information (e.g., the payment data 252 of FIG. 2-4). Data corresponding to the signal(s) to be transmitted by the radio transmitter 414 may be of any type, form and/or format, and may be stored in a computer-readable storage medium such as the example memory 412 described below.

The example radio receiver 416 of FIG. 4 collects, acquires and/or receives data and/or one or more signal(s) from the remote server 150 of FIGS. 1 and/or 3. In some examples, the data and/or signal(s) received by the radio receiver 416 is/are communicated via a network such as the example cellular network 140 of FIG. 1. In some examples, the radio receiver 416 may receive data and/or signal(s) corresponding to aggregated use information (e.g., the aggregated use data 324 of FIGS. 3 and 4) including one or more of aggregated vehicle location information (e.g., the aggregated location data 326 of FIGS. 3 and 4), aggregated fee information (e.g., the aggregated fee data 328 of FIGS. 3 and 4), aggregated availability information (e.g., the aggregated availability data 330 of FIGS. 3 and 4), aggregated charging device type information (e.g., the aggregated charging device type data 332 of FIGS. 3 and 4), and/or aggregated charge rate information (e.g., the aggregated charge rate data 334 of FIGS. 3 and 4). In some examples, the radio receiver 416 may receive data and/or signal(s) corresponding to a reservation confirmation and/or reservation information (e.g., the reservation data 246 of FIGS. 2-4) including time information (e.g., the time data 2448 of FIG. 2-4), authentication information (e.g., the authentication data 250 of FIG. 2-4), and/or payment information (e.g., the payment data 252 of FIG. 2-4). Data identified and/or derived from the signal(s) collected and/or received by the radio receiver 416 may be of any type, form and/or format, and may be stored in a computer-readable storage medium such as the example memory 412 described below.

The example user interface 404 of FIG. 4 facilitates interactions and/or communications between an end user and the mobile device 170 of FIGS. 1 and/or 4. The user interface 404 includes one or more input device(s) 418 via which the user may input information and/or data to the mobile device 170. For example, the input device(s) 418 may be a button, a microphone, and/or a touchscreen that enable(s) the user to convey data and/or commands to the mobile device 170. The user interface 404 of FIG. 4 also includes one or more output device(s) 420 via which the user interface 404 and/or, more generally, the mobile device 170 presents information and/or data in visual and/or audible form to the user. For example, the output device(s) 420 may include a light emitting diode, a touchscreen, and/or a liquid crystal display for presenting visual information, and/or a speaker for presenting audible information. Data and/or information that is presented and/or received via the user interface 404 may be of any type, form and/or format, and may be stored in a computer-readable storage medium such as the example memory 412 described below.

The example GPS receiver 406 of FIG. 4 collects, acquires and/or receives data and/or one or more signal(s) from one or more GPS satellite(s) (not shown). The data and/or signal(s) received by the GPS receiver 406 may include information from which the current position and/or location of the mobile device 170 of FIGS. 1 and/or 4 may be identified and/or derived, including for example, the current latitude and longitude of the mobile device 170. Mobile device location data identified and/or derived from the signal(s) collected and/or received by the GPS receiver 406 may be associated with one or more time(s) (e.g., time stamped) at which the data and/or signal(s) were collected and/or received by the GPS receiver 406. Mobile device location data identified and/or derived from the signal(s) collected and/or received by the GPS receiver 406 may be of any type, form and/or format, and may be stored in a computer-readable storage medium such as the example memory 412 described below.

The example charging service matcher 408 of FIG. 4 analyzes the use data 324 and the reservation data 246 stored in memory 412 to determine if a match may be made as between a charging device 120 (via the use data 324) and a drone (via the reservation data 246).

In some examples, the charging service matcher 408 of FIG. 4 compares use data (e.g., the aggregated use data 324 of FIGS. 3 and 4) and reservation data 246 (e.g., a request to charge a drone, a general location in which the charging of the drone is desired to occur, etc.) against an initial criteria, such as a location. For example, an initial determination may include identifying locations of all charging devices 120 within a selected range of a location of the drone (e.g., within an operation range of the drone, within a remaining flight envelope of the drone, etc.), locations of all charging devices 120 within a selected range of a location of the mobile device 170, or locations of all charging devices 120 within a selected range of a location specified in the reservation data 246, which may not be a current location of a drone. In some examples, charging devices 120 outside of the operational range of the drone may be excluded from consideration. Any charging device(s) 120 determined by the example charging service matcher 408 to be within an operational range of the drone may then be further considered for additional degrees of matching between the use data and the reservation data.

In some examples, the charging service matcher 408 of FIG. 4 concurrently or subsequently determines whether or not the identified locations of all charging devices 120 within a selected range of a location of the drone, mobile device 170, or location specified in the reservation data 246 also satisfy a time or range of times specified in the reservation data 246 (e.g., immediately, within 5 minutes, within 30 minutes, within a specific range of times, etc.). This comparison would eliminate, for example, charging devices 120 which may be within range of a selected location specified for the charging service to be performed, but would not be within that range of the selected location at a time at which the charging service is required to be performed.

In some examples, a further determination by the charging service matcher 408 of FIG. 4 may include evaluation of the received use data (e.g., an availability of one or more charging devices, location information for the vehicle, a size of the charging devices, a size of a drone that may be accommodated, a weight of a drone that may be accommodated, a type or types of charging devices available, battery purchase options, battery swapping options, battery rental options, etc.) to determine which of the potentially available charging devices are, in fact, usable by the drone and consistent with the reservation data 246. As a further refinement, a determination of available charging devices 120 that are usable may be parsed into available charging devices 120 able to provide, for example, a desired charge rate capability (e.g., the rate(s) at which the charging device can safely charge the drone) or other charging features (e.g., balancing features, etc.).

In some examples, a further determination by the charging service matcher 408 of FIG. 4 may include, as to usable charging device(s) 120 within an operation range of the drone, evaluation of the received use information 324 (e.g., fee information) to determine which of the usable charging device(s) 120 is to be selected to provide the charging service, such as based on a cost of a charging service or a battery swap service. Acceptable fees, or ranges of fees, may be specified in the reservation data 246. In other examples, where the reservation data 246 may not include a pre-approved acceptable fee or range of acceptable fees, the example charging service matcher 408 is to communicate with the mobile device 170 of FIGS. 1 and/or 4 via the cellular network 140 to verify an acceptance of fee information for one or more selected matching charging device(s) 120.

The example reservation manager 410 of FIG. 4 is to handle the reservation requests and reservation data 246 to be provided to the remote server 150 of FIGS. 1 and/or 3 and is to obtain reservation confirmation as to a matching charging device 120 and pertinent use data 324. The example reservation manager 410 broadcasts the reservation data 246 (e.g., a make and model of the drone, a weight of the drone, a skid type, a color, markings on the drone, an electronic signature of the drone, a request to charge a drone, a general location in which the charging of the drone is desired to occur, fees or ranges of fees that would be acceptable, an estimated starting time for charging, a period of time over which charging is to be performed, etc.) to the remote server 150 of FIGS. 1 and/or 3 via the communication interface 402. Following a matching of the drone to a charging device 120, the example reservation manager 410 receives from the remote server 150 of FIGS. 1 and/or 3, via communication interface 402, a reservation confirmation and/or use information (e.g., location of the charging device 120, make and model of the vehicle, etc.) enabling navigation of the drone to the charging device 120.

The example memory 412 of FIG. 4 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the memory 412 may be stored in any file and/or data structure format, organization scheme, and/or arrangement. In some examples, the memory 412 stores aggregated use information and/or data (e.g., the aggregated use data 324 of FIGS. 3 and 4). In some examples, the aggregated use information and/or data includes aggregated vehicle location information and/or data (e.g., the aggregated location data 326 of FIGS. 3 and 4). In some examples, the aggregated use information and/or data includes aggregated fee information and/or data (e.g., the aggregated fee data 328 of FIGS. 3 and 4). In some examples, the aggregated use information and/or data includes aggregated availability information and/or data (e.g., the aggregated availability data 330 of FIGS. 3 and 4). In some examples, the aggregated use information and/or data includes aggregated charging device type information and/or data (e.g., the aggregated charging device type data 332 of FIGS. 3 and 4). In some examples, the aggregated use information and/or data includes aggregated charge rate information and/or data (e.g., the aggregated charge rate data 334 of FIGS. 3 and 4). In some examples, the memory 412 stores a reservation confirmation and/or reservation information and/or data (e.g., the reservation data 246 of FIGS. 2-4). In some examples, the reservation information and/or data includes time information and/or data (e.g., the time data 248 of FIGS. 2-4). In some examples, the reservation information and/or data includes authentication information and/or data (e.g., the authentication data 250 of FIGS. 2-4). In some examples, the reservation information and/or data includes payment information and/or data (e.g., the payment data 252 of FIGS. 2-4). The memory 412 is accessible to the example communication interface 402, the example user interface 404, the example GPS receiver 406, the example charging service matcher 408 and the example reservation manager 410 of FIG. 4, and/or, more generally, to the example mobile device 170 of FIGS. 1 and/or 4.

While an example manner of implementing the example mobile device 170 is illustrated in FIG. 4, one or more of the elements, processes and/or devices illustrated in FIG. 4 may be combined, divided, re-arranged, omitted, eliminated and/or implemented in any other way. Further, the example communication interface 402, the example user interface 404, the example GPS receiver 406, the example charging service matcher 408, the example reservation manager 410 and/or the example memory 412 of FIG. 4 may be implemented by hardware, software, firmware and/or any combination of hardware, software and/or firmware. Thus, for example, any of the example communication interface 402, the example user interface 404, the example GPS receiver 406, the example charging service matcher 408, the example reservation manager 410 and/or the example memory 412 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 402, the example user interface 404, the example GPS receiver 406, the example charging service matcher 408, the example reservation manager 410 and/or the example memory 412 of FIG. 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example mobile device 170 of FIGS. 1 and/or 4 may include one or more elements, processes and/or devices in addition to, or instead of, those illustrated in FIG. 4, and/or may include more than one of any or all of the illustrated elements, processes and devices.

Figure 5:
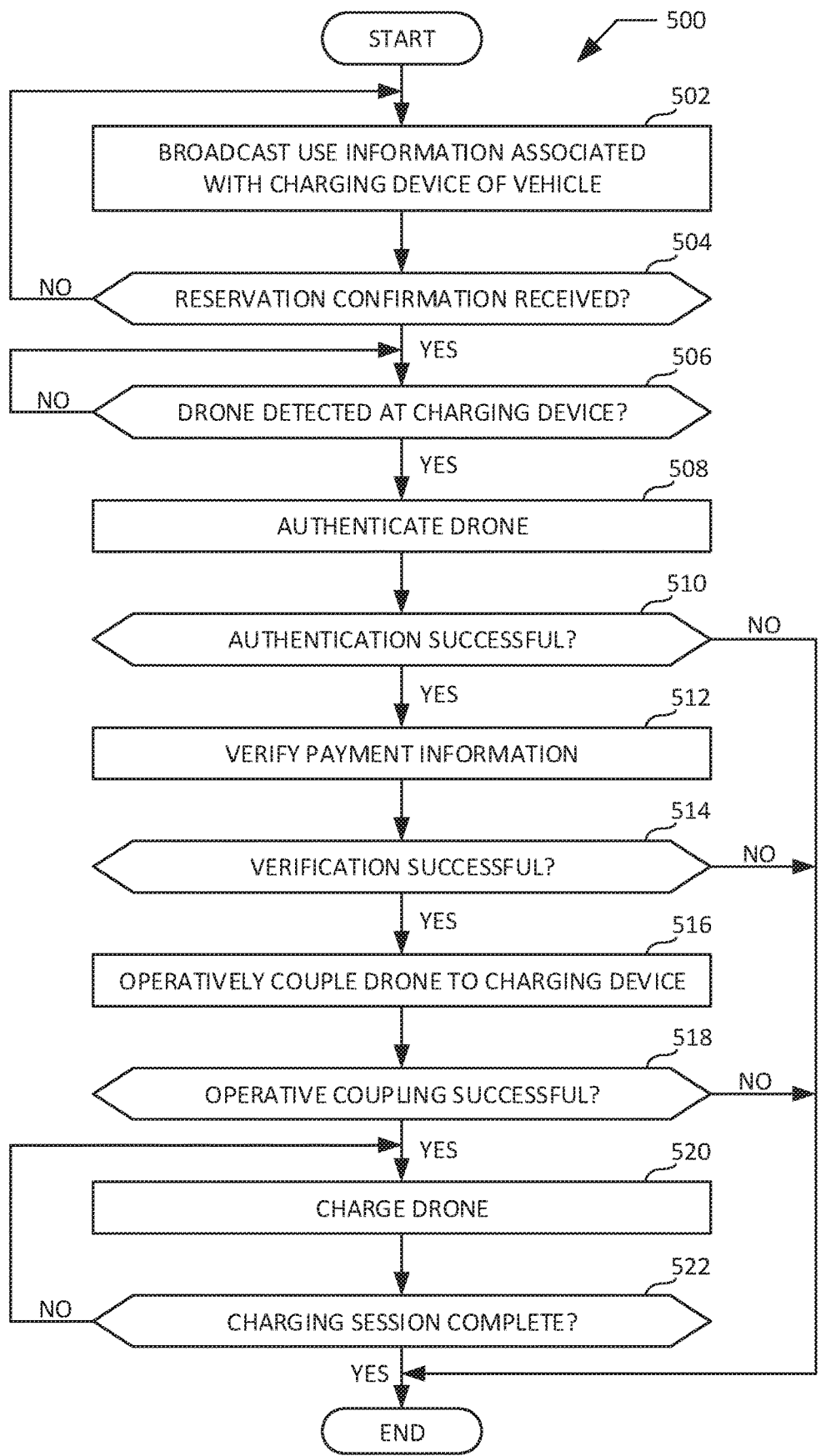
FIG. 5 is a flowchart representative of an example method that may be executed at the example vehicle-based drone charging apparatus of FIGS. 1 and 2 to charge a drone.
Figure 6:
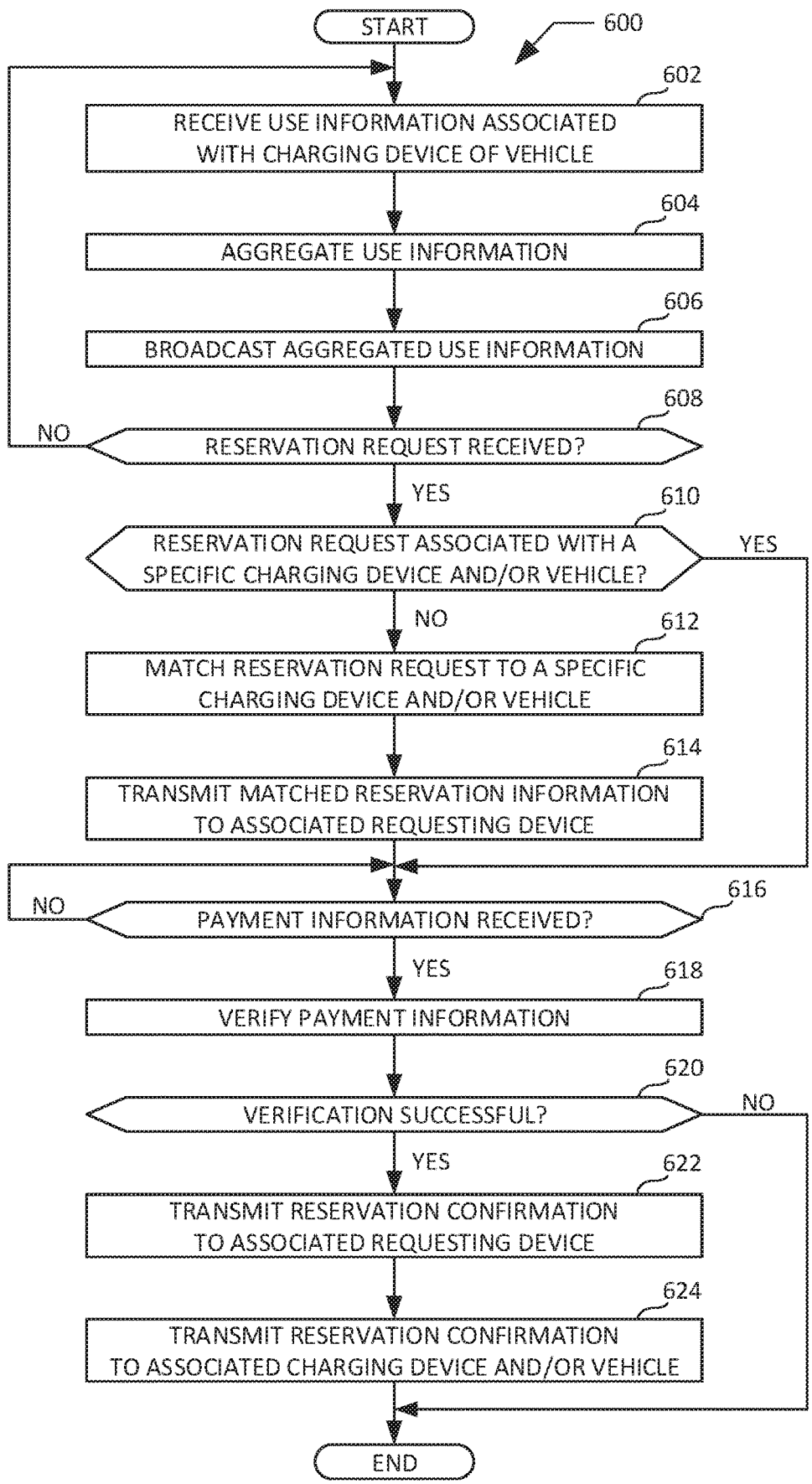
FIG. 6 is a flowchart representative of an example method that may be executed at the example remote server of FIGS. 1 and 3 to generate and transmit an example reservation confirmation for a drone charging session associated with the vehicle-based drone charging apparatus of FIGS. 1 and 2.
Figure 7:
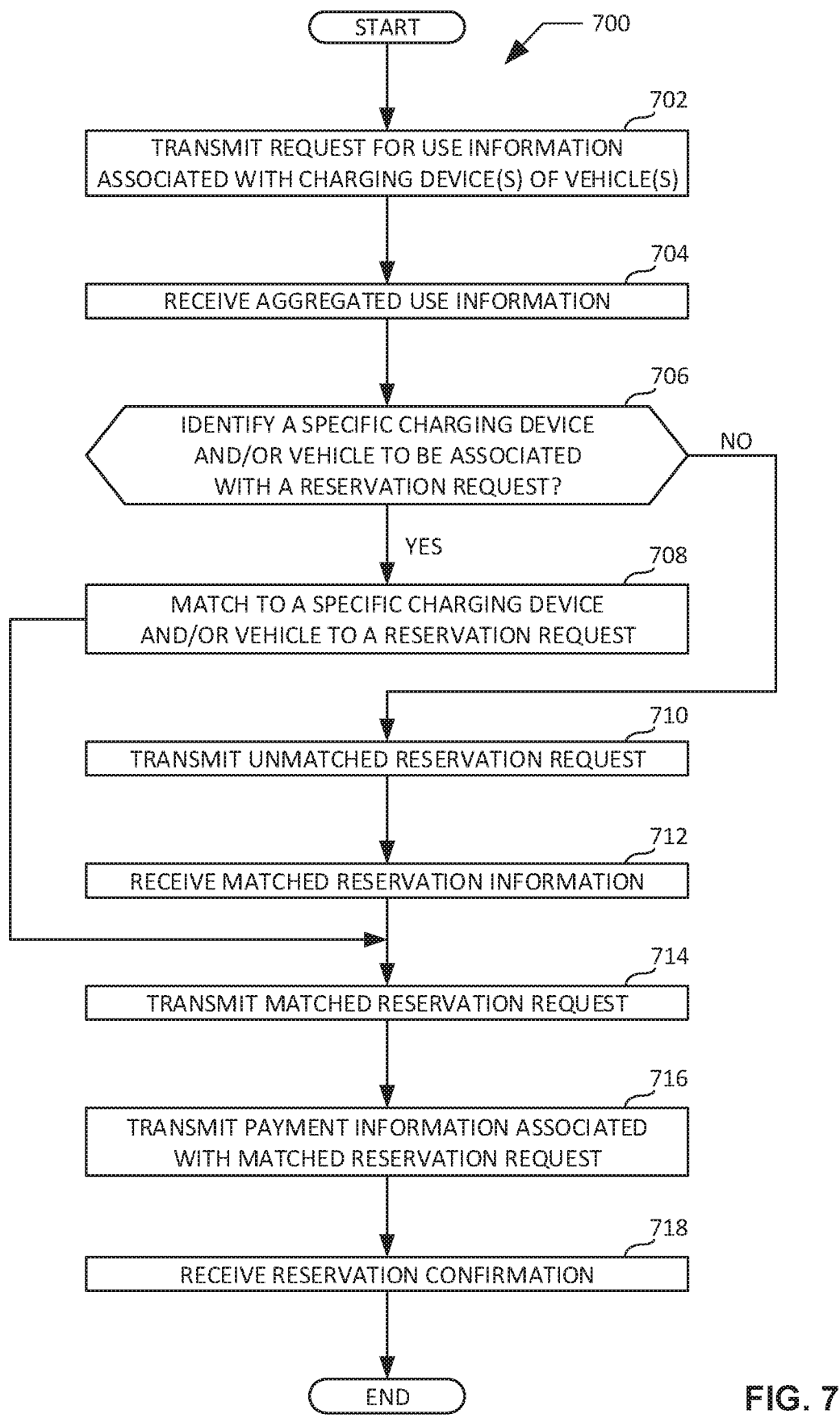
FIG. 7 is a flowchart representative of an example method that may be executed at the example mobile device of FIGS. 1 and 4 to generate and transmit an example reservation request for a drone charging session associated with the vehicle-based drone charging apparatus of FIGS. 1 and 2.

Flowcharts representative of example methods for charging a drone via a vehicle-based drone charging apparatus, for generating and transmitting a reservation confirmation for a drone charging session associated with the vehicle-based drone charging apparatus, and for generating and transmitting a reservation request for a drone charging session associated with the vehicle-based drone charging apparatus are shown in FIGS. 5-7. In these examples, the methods may be implemented using machine-readable instructions that comprise one or more program(s) for execution by a processor such as the example processor 802 of the example processor platform 800 discussed below in connection with FIG. 8, the example processor 902 of the example processor platform 900 discussed below in connection with FIG. 9, and/or the example processor 1000 of the example processor platform 1000 discussed below in connection with FIG. 10. The one or more program(s) may be embodied in software stored on a tangible computer readable storage medium such as a CD-ROM, a floppy disk, a hard drive, a digital versatile disk (DVD), a Blu-ray disk, or a memory associated with the processor 802, the processor 902, and/or the processor 1002, but the entire program(s) and/or parts thereof could alternatively be executed by a device other than the processor 802, the processor 902 or the processor 1002, and/or embodied in firmware or dedicated hardware. Further, although the example program(s) is/are described with reference to the flowcharts illustrated in FIGS. 5-7, many other methods for charging a drone via a vehicle-based drone charging apparatus, for generating and transmitting a reservation confirmation for a drone charging session associated with the vehicle-based drone charging apparatus, and for generating and transmitting a reservation request for a drone charging session associated with the vehicle-based drone charging apparatus may alternatively be used. For example, the order of execution of the blocks may be changed, and/or some of the blocks described may be changed, eliminated, or combined.

As mentioned above, the example methods of FIGS. 5-7 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 5-7 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flowchart representative of an example method 500 that may be executed at the example vehicle-based drone charging apparatus 110 of FIGS. 1 and/or 2 to charge a drone. The example method 500 begins when the example communication interface 212 of FIG. 2 broadcasts use information associated with a charging device of a vehicle (block 502). For example, the communication interface 212 may broadcast use information (e.g., the use data 234 of FIG. 2) associated with the charging device 202 of FIG. 2. Following block 502, control of the example method 500 of FIG. 5 proceeds to block 504.

At block 504, the example charging controller 222 of FIG. 2 determines whether a reservation confirmation has been received (block 504). For example, the charging controller 222 may determine that a reservation confirmation (e.g., the reservation data 246 of FIG. 2) has been received at the vehicle-based drone charging apparatus 110 of FIGS. 1 and/or 2 via the communication interface 212 of FIG. 2. If the charging controller 222 determines at block 504 that a reservation confirmation has not been received, control of the example method 500 of FIG. 5 returns to block 502. If the charging controller 222 instead determines at block 504 that a reservation confirmation has been received, control of the example method 500 of FIG. 5 proceeds to block 506.

At block 506, the example charging controller 222 of FIG. 2 determines whether a drone is detected at the charging device 202 of FIG. 2 (block 506). For example, the charging controller 222 may determine that a drone has been placed on the charging device 202 based on weight data sensed, measured and/or detected by the sensor 208 of FIG. 2. If the charging controller 222 determines at block 506 that a drone is not detected at the charging device 202, control of the example method 500 of FIG. 5 remains at block 506. If the charging controller 222 instead determines at block 506 that a drone is detected at the charging device 202, control of the example method 500 of FIG. 5 proceeds to block 508.

At block 508, the example drone authenticator 216 of FIG. 2 authenticates the drone (block 508). For example, the drone authenticator 216 may verify that the drone at the charging device 202 matches the drone associated with the reservation data 246. In some examples, the drone authenticator 216 may compare one or more drone features (e.g., size, shape, weight, a reservation confirmation code, etc.) included in the reservation data 246 relative to corresponding authentication data 250 (e.g., size, shape, weight, a reservation confirmation code, etc.). As another example, the example drone authenticator 216 may authenticate an identify of the drone via a wireless pairing of the drone to the charging controller 222 of FIG. 2, in which identifying authentication data 250 is provided by the drone. Following block 508, control of the example method 500 of FIG. 5 proceeds to block 510.

At block 510, the example charging controller 222 of FIG. 2 determines whether the authentication of the drone was successful (block 510). For example, the charging controller 222 may determine that the authentication of the drone was successful based on data and/or one or more signal(s), message(s) and/or command(s) obtained from, accessed from and/or provided by the drone authenticator 216 indicating a match of one or more item(s) of authentication information and/or data stored in the example memory 224 of FIG. 2 (e.g., the authentication data 250 of FIG. 2) to one or more feature(s) of the drone that is in contact with the charging device 202 of FIG. 2. If the charging controller 222 determines at block 510 that the authentication of the drone was successful, control of the example method 500 of FIG. 5 proceeds to block 512. If the charging controller 222 instead determines at block 510 that the authentication of the drone was not successful, the example method 500 of FIG. 5 ends.

At block 512, the example payment verifier 214 of FIG. 2 verifies the payment information associated with charging the drone (block 512). For example, the example payment verifier 214 may verify that the obtained/received payment information is valid, and/or verify that data received via the radio receiver 228 of FIG. 2 from a source (e.g., the remote server 150 of FIGS. 1 and/or 3, a payment clearinghouse, etc.) establishes that payment information is valid and/or that payment has been made, or that payment for an amount corresponding to an expecting charging service is pre-authorized. For example, the payment verifier 214 may authenticate payment information provided with or subsequent to a reservation request and/or a reservation confirmation for a drone charging session, such as payment authentication through a transaction processing clearinghouse, and by providing the charging controller 222 with an authentication of payment information for use of the charging device. Following block 512, control of the example method 500 of FIG. 5 proceeds to block 514.

At block 514, the example charging controller 222 of FIG. 2 determines whether the verification of the payment information was successful (block 514). For example, the charging controller 222 may determine that payment information associated with charging the drone has been successfully verified based on data and/or one or more signal(s), message(s) and/or command(s) obtained from, accessed from and/or provided by the payment verifier 214. If the charging controller 222 determines at block 514 that the verification of the payment information was successful, control of the example method 500 of FIG. 5 proceeds to block 516. If the charging controller 222 instead determines at block 514 that the verification of the payment information was not successful, the example method 500 of FIG. 5 ends.

At block 516, the example charging controller 222 of FIG. 2 operatively couples the drone to the charging device (block 516). For example, the charging controller 222 may operatively couple the drone to the charging device 202 of FIG. 2 by wirelessly pairing the drone to the vehicle associated with the charging device 202. Following block 516, control of the example method 500 of FIG. 5 proceeds to block 518.

At block 518, the example charging controller 222 of FIG. 2 determines whether the drone has successfully been operatively coupled to the charging device (block 518). For example, the charging controller 222 may determine that the drone has successfully been operatively coupled to the charging device 202 of FIG. 2 based on data and/or one or more signal(s), message(s) and/or command(s) obtained from, accessed from and/or provided by the charging controller 222 and/or the charging device 202 indicating that the drone is wirelessly paired with the charging device 202. If the charging controller 222 determines at block 518 that the drone has successfully been operatively coupled to the charging device, control of the example method 500 of FIG. 5 proceeds to block 520. If the charging controller 222 instead determines at block 518 that the drone has not successfully been operatively coupled to the charging device, the example method 500 of FIG. 5 ends.

At block 520, the example charging device 202 of FIG. 2 charges the drone (block 520). For example, the charging device 202 may charge a battery of the drone by supplying energy stored at the vehicle battery 204 of FIG. 2 to the battery of the drone. Following block 520, control of the example method 500 of FIG. 5 proceeds to block 522.

At block 522, the example charging controller 222 of FIG. 2 determines whether a charging session for the drone is complete (block 522). For example, the charging controller 222 may determine that the charging session for the drone is complete based on data and/or one or more signal(s), message(s) and/or command(s) obtained from, accessed from and/or provided by the charging controller 222 and/or the charging device 202 of FIG. 2 indicating that the battery of the drone has been charged for a predetermined duration and/or to a predetermined capacity. If the charging controller 222 determines at block 522 that the charging session for the drone is not complete, control of the example method 500 of FIG. 5 returns to block 522. If the charging controller 222 instead determines at block 522 that the charging session for the drone is complete, the example method 500 of FIG. 5 ends.

FIG. 6 is a flowchart representative of an example method 600 that may be executed at the example remote server 150 of FIGS. 1 and/or 3 to generate and transmit a reservation confirmation for a drone charging session associated with the vehicle-based drone charging apparatus 110 of FIGS. 1 and/or 2. The example method 600 begins when the example communication interface 302 of FIG. 3 receives use information associated with a charging device of a vehicle (block 602). For example, the communication interface 302 may receive use information (e.g., the use data 234 of FIG. 2) associated with the charging device 202 from the vehicle-based drone charging apparatus 110 of FIG. 2. Following block 602, control of the example method 600 of FIG. 6 proceeds to block 604.

At block 604, the example data aggregator 306 of FIG. 3 aggregates the received use information (block 604). For example, the data aggregator 306 may generate aggregated use information (e.g., the aggregated use information 324 of FIG. 3) by combining and or aggregating the use information associated with the charging device 202 with other use information associated with other charging devices. Following block 604, control of the example method 600 of FIG. 6 proceeds to block 606.

At block 606, the example communication interface 302 of FIG. 3 broadcasts aggregated use information associated with charging devices of vehicles (block 606). For example, the communication interface 302 may broadcast aggregated use information (e.g., the aggregated use data 324 of FIG. 3) associated with the charging devices including the example charging device 202 of FIG. 2. Following block 606, control of the example method 600 of FIG. 6 proceeds to block 608.

At block 608, the example reservation manager 310 of FIG. 3 determines whether a reservation request has been received (block 608). For example, the reservation manager 310 may determine that a reservation request has been received at the remote server 150 of FIGS. 1 and/or 3 via the communication interface 302 of FIG. 3. If the reservation manager 310 determines at block 608 that a reservation request has not been received, control of the example method 600 of FIG. 6 returns to block 602. If the reservation manager 310 instead determines at block 608 that a reservation request has been received, control of the example method 600 of FIG. 6 proceeds to block 610.

At block 610, the example reservation manager 310 of FIG. 3 determines whether the reservation request is associated with a specific charging device and/or vehicle (block 610). For example, the reservation manager 310 may determine that the reservation request is associated with the example charging device 202 of FIG. 2. If the reservation manager 310 determines at block 610 that a reservation request is not associated with a specific charging device and/or vehicle, control of the example method 600 of FIG. 6 proceeds to block 612. If the reservation manager 310 instead determines at block 610 that the reservation request is associated with a specific charging device and/or vehicle, control of the example method 600 of FIG. 6 proceeds to block 616.

At block 612, the example charging service matcher 308 of FIG. 3 matches the reservation request to a specific charging device and/or vehicle (block 612). For example, the example charging service matcher 308 may access the example data aggregator 306 of FIG. 3 to analyze the use data (e.g., the aggregated use data 324 of FIG. 3) and the reservation data (e.g., the reservation data 246 of FIG. 3) to determine if a match may be made as between a charging device 120 (via the aggregated use data 324) and a drone (via the reservation data 246). In some examples, the charging service matcher 308 of FIG. 3 may sort the use data and reservation data against an initial criteria, such as a location. For example, an initial determination may include identifying locations of all charging devices 120 within a selected range of a location of the drone (e.g., within an operation range of the drone, within a remaining flight envelope of the drone, etc.), locations of all charging devices 120 within a selected range of a location of the mobile device 170, or locations of all charging devices 120 within a selected range of a location specified in the reservation data 246, which may not be a current location of a drone. In some examples, charging devices 120 outside of the operational range of the drone may be excluded from consideration. Any charging device(s) 120 determined by the example charging service matcher 308 to be within an operational range of the drone may then be further considered for additional degrees of matching between the use data and the reservation data. In some examples, the charging service matcher 308 of FIG. 3 concurrently or subsequently determines whether or not the identified locations of all charging devices 120 within a selected range of a location of the drone, mobile device 170, or location specified in the reservation data 246 also satisfy a time or range of times specified in the reservation data 246 (e.g., immediately, within 5 minutes, within 30 minutes, within a specific range of times, etc.). This comparison would eliminate, for example, charging devices 120 which may be within range of a selected location specified for the charging service to be performed, but would not be within that range of the selected location at a time at which the charging service is required to be performed. In some examples, a further determination by the charging service matcher 308 of FIG. 3 may include evaluation of the received use data (e.g., an availability of one or more charging devices, location information for the vehicle, a size of the charging devices, a size of a drone that may be accommodated, a weight of a drone that may be accommodated, a type or types of charging devices available, battery purchase options, battery swapping options, battery rental options, etc.) to determine which of the potentially available charging devices are, in fact, usable by the drone and consistent with the reservation data 246. As a further refinement, a determination of available charging devices 120 that are usable may be parsed into available charging devices 120 able to provide, for example, a desired charge rate capability (e.g., the rate(s) at which the charging device can safely charge the drone) or other charging features (e.g., balancing features, etc.). In some examples, a further determination by the charging service matcher 308 of FIG. 3 may include, as to usable charging device(s) 120 within an operation range of the drone, evaluation of the received use information (e.g., fee information) to determine which of the usable charging device(s) 120 is to be selected to provide the charging service, such as based on a cost of a charging service or a battery swap service. Acceptable fees, or ranges of fees, may be specified in the reservation data 246. In other examples, where the reservation data 246 may not include a pre-approved acceptable fee or range of acceptable fees, the charging service matcher 308 of FIG. 3 is to communicate with the mobile device 170 of FIGS. 1 and/or 4 via the cellular network 140 to verify an acceptance of fee information for one or more selected matching charging device(s) 120. Following block 612, control of the example method 600 of FIG. 6 proceeds to block 614.

At block 614, the example communication interface 302 of FIG. 3 transmits matched reservation information to the requesting device associated with the matched reservation information (block 614). For example, the communication interface 302 may transmit reservation information to the example mobile device 170 of FIGS. 1 and/or 4 indicating a specific charging device (e.g., the charging device 202 of FIG. 2) and/or a specific vehicle at which a reservation for drone charging is to be confirmed. Following block 614, control of the example method 600 of FIG. 6 proceeds to block 616.

At block 616, the example payment verifier 312 of FIG. 3 determines whether payment information associated with the reservation request has been received (block 616). For example, the payment verifier 312 may determine that payment information associated with the reservation request has been received at the remote server 150 of FIGS. 1 and/or 3 via the communication interface 302 of FIG. 3. If the payment verifier 312 determines at block 616 that payment information associated with the reservation request has not been received, control of the example method 600 of FIG. 6 remains at block 616. If the payment verifier 312 instead determines at block 616 that payment information associated with the reservation request has been received, control of the example method 600 of FIG. 6 proceeds to block 618.

At block 618, the example payment verifier 312 of FIG. 3 verifies the payment information associated with charging the drone (block 618). For example, the payment verifier 312 may verify that the received payment data 252 is valid. In some examples, the payment verifier 312 may use the payment data 252 to conduct a payment verification authorization, such as by broadcasting the payment data 252, via the communication interface 302, to a clearinghouse for pre-approval. The pre-approval may include, for example, confirmation that the payment information is valid and/or that payment has been made, or that payment for an amount corresponding to an expecting charging service is authorized. Following block 618, control of the example method 600 of FIG. 6 proceeds to block 620.

At block 620, the example reservation manager 310 of FIG. 3 determines whether the verification of the payment information was successful (block 620). For example, the reservation manager 310 may determine that payment information associated with charging the drone has been successfully verified based on data and/or one or more signal(s), message(s) and/or command(s) obtained from, accessed from and/or provided by the payment verifier 312. If the reservation manager 310 determines at block 620 that the verification of the payment information was successful, control of the example method 600 of FIG. 6 proceeds to block 622. If the reservation manager 310 instead determines at block 620 that the verification of the payment information was not successful, the example method 600 of FIG. 6 ends.

At block 622, the example communication interface 302 of FIG. 3 transmits a reservation confirmation to the requesting device associated with the reservation confirmation (block 622). For example, the communication interface 302 may transmit a reservation confirmation (e.g., the reservation data 246 of FIGS. 2-4) to the example mobile device 170 of FIGS. 1 and/or 4 indicating a specific time and a specific charging device (e.g., the charging device 202 of FIG. 2) at which the drone is to be charged. Following block 622, control of the example method 600 of FIG. 6 proceeds to block 624.

At block 624, the example communication interface 302 of FIG. 3 transmits the reservation confirmation to the charging device and/or vehicle associated with the reservation confirmation (block 624). For example, the communication interface 302 may transmit the reservation confirmation (e.g., the reservation data 246 of FIGS. 2-4) to the charging device 202 of FIG. 2 and/or, more generally, to the vehicle-based drone charging apparatus 110 of FIG. 2, indicating a specific time at which a specific drone is to be charged. Following block 624, the example method 600 of FIG. 6 ends.

FIG. 7 is a flowchart representative of an example method 700 that may be executed at the example mobile device 170 of FIGS. 1 and/or 4 to generate and transmit an example reservation request for a drone charging session associated with the vehicle-based drone charging apparatus 110 of FIGS. 1 and/or 2. The example method 700 begins when the example communication interface 402 of FIG. 4 transmits a request for use information associated with one or more charging device(s) of vehicle(s) (block 702). For example, the communication interface 402 may transmit a request to the remote server 150 of FIGS. 1 and/or 3 requesting use information associated with charging devices of vehicles. Following block 702, control of the example method 700 of FIG. 7 proceeds to block 704.

At block 704, the example communication interface 402 of FIG. 4 receives aggregated use information associated with charging devices of vehicles (block 704). For example, the communication interface 402 may receive aggregated use information (e.g., the aggregated use data 324 of FIGS. 3 and 4) associated with the charging devices of vehicles including the charging device 202 of the vehicle-based drone charging apparatus 110 of FIG. 2. Following block 704, control of the example method 700 of FIG. 7 proceeds to block 706.

At block 706, the example reservation manager 410 of FIG. 4 determines whether to identify a specific charging device and/or vehicle to be associated with a reservation request (block 706). For example, the reservation manager 410 may determine that example charging device 202 of FIG. 2 is to be identified and/or associated with a reservation request to be transmitted by the example communication interface 402 of FIG. 4. If the reservation manager 410 determines at block 706 to identify a specific charging device and/or vehicle to be associated with a reservation request, control of the example method 700 of FIG. 7 proceeds to block 708. If the reservation manager 410 instead determines at block 706 not to identify a specific charging device and/or vehicle to be associated with a reservation request, control of the example method 600 of FIG. 6 proceeds to block 710.

At block 708, the example charging service matcher 408 of FIG. 4 matches a specific charging device and/or vehicle to a reservation request (block 708). For example, the charging service matcher 408 may compares use data (e.g., the aggregated use data 324 of FIGS. 3 and 4) and reservation data 246 (e.g., a request to charge a drone, a general location in which the charging of the drone is desired to occur, etc.) against an initial criteria, such as a location. For example, an initial determination may include identifying locations of all charging devices 120 within a selected range of a location of the drone (e.g., within an operation range of the drone, within a remaining flight envelope of the drone, etc.), locations of all charging devices 120 within a selected range of a location of the mobile device 170, or locations of all charging devices 120 within a selected range of a location specified in the reservation data 246, which may not be a current location of a drone. In some examples, charging devices 120 outside of the operational range of the drone may be excluded from consideration. Any charging device(s) 120 determined by the charging service matcher 408 of FIG. 4 to be within an operational range of the drone may then be further considered for additional degrees of matching between the use data and the reservation data. Alternatively, the charging service matcher 408 of FIG. 4 may compare every record in the use data to every record in the reservation data to determine matches. In some examples, the charging service matcher 408 of FIG. 4 concurrently or subsequently determines whether or not the identified locations of all charging devices 120 within a selected range of a location of the drone, mobile device 170, or location specified in the reservation data 246 also satisfy a time or range of times specified in the reservation data 246 (e.g., immediately, within 5 minutes, within 30 minutes, within a specific range of times, etc.). This comparison would eliminate, for example, charging devices 120 which may be within range of a selected location specified for the charging service to be performed, but would not be within that range of the selected location at a time at which the charging service is required to be performed. In some examples, a further determination by the charging service matcher 408 of FIG. 4 may include evaluation of the received use data (e.g., an availability of one or more charging devices, location information for the vehicle, a size of the charging devices, a size of a drone that may be accommodated, a weight of a drone that may be accommodated, a type or types of charging devices available, battery purchase options, battery swapping options, battery rental options, etc.) to determine which of the potentially available charging devices are, in fact, usable by the drone and consistent with the reservation data 246. As a further refinement, a determination of available charging devices 120 that are usable may be parsed into available charging devices 120 able to provide, for example, a desired charge rate capability (e.g., the rate(s) at which the charging device can safely charge the drone) or other charging features (e.g., balancing features, etc.). In some examples, a further determination by the charging service matcher 408 of FIG. 4 may include, as to usable charging device(s) 120 within an operation range of the drone, evaluation of the received use information (e.g., fee information) to determine which of the usable charging device(s) 120 is to be selected to provide the charging service, such as based on a cost of a charging service or a battery swap service. Acceptable fees, or ranges of fees, may be specified in the reservation data 246. Following block 708, control of the example method 700 of FIG. 7 proceeds to block 714.

At block 710, the example communication interface 402 of FIG. 4 transmits an unmatched reservation request (block 710). For example, the communication interface 402 may transmit an unmatched reservation request to the remote server 150 of FIGS. 1 and/or 3 requesting that the remote server 150 specify (e.g., match) a charging device and/or vehicle at which a drone is to be charged. Following block 710, control of the example method 700 of FIG. 7 proceeds to block 712.

At block 712, the example communication interface 402 of FIG. 4 receives matched reservation information (block 712). For example, the communication interface 402 may receive matched reservation information from the remote server 150 of FIGS. 1 and/or 3 associating a specific charging device (e.g., the charging device 202 of FIG. 2) and/or vehicle with a drone to be charged. Following block 712, control of the example method 700 of FIG. 7 proceeds to block 714.

At block 714, the example communication interface 402 of FIG. 4 transmits a matched reservation request (block 714). For example, the communication interface 402 may transmit a matched reservation request to the remote server 150 of FIGS. 1 and/or 3 requesting that the remote server 150 confirm a reservation for a charging session with the charging device (e.g., the charging device 202 of FIG. 2) and/or vehicle associated with the matched reservation request. Following block 714, control of the example method 700 of FIG. 7 proceeds to block 716.

At block 716, the example communication interface 402 of FIG. 4 transmits payment information associated with the matched reservation request (block 716). For example, the communication interface 402 may transmit payment information associated with the matched reservation request to the remote server 150 of FIGS. 1 and/or 3. Following block 716, control of the example method 700 of FIG. 7 proceeds to block 718.

At block 718, the example communication interface 402 of FIG. 4 receives a reservation confirmation (block 718). For example, the communication interface 402 may receive a reservation confirmation (e.g., the reservation data 246 of FIGS. 2-4) from the remote server 150 of FIGS. 1 and/or 3 indicating a specific time and a specific charging device (e.g., the charging device 202 of FIG. 2) at which the drone is to be charged. Following block 718, the example method 700 of FIG. 7 ends.

Figure 8:
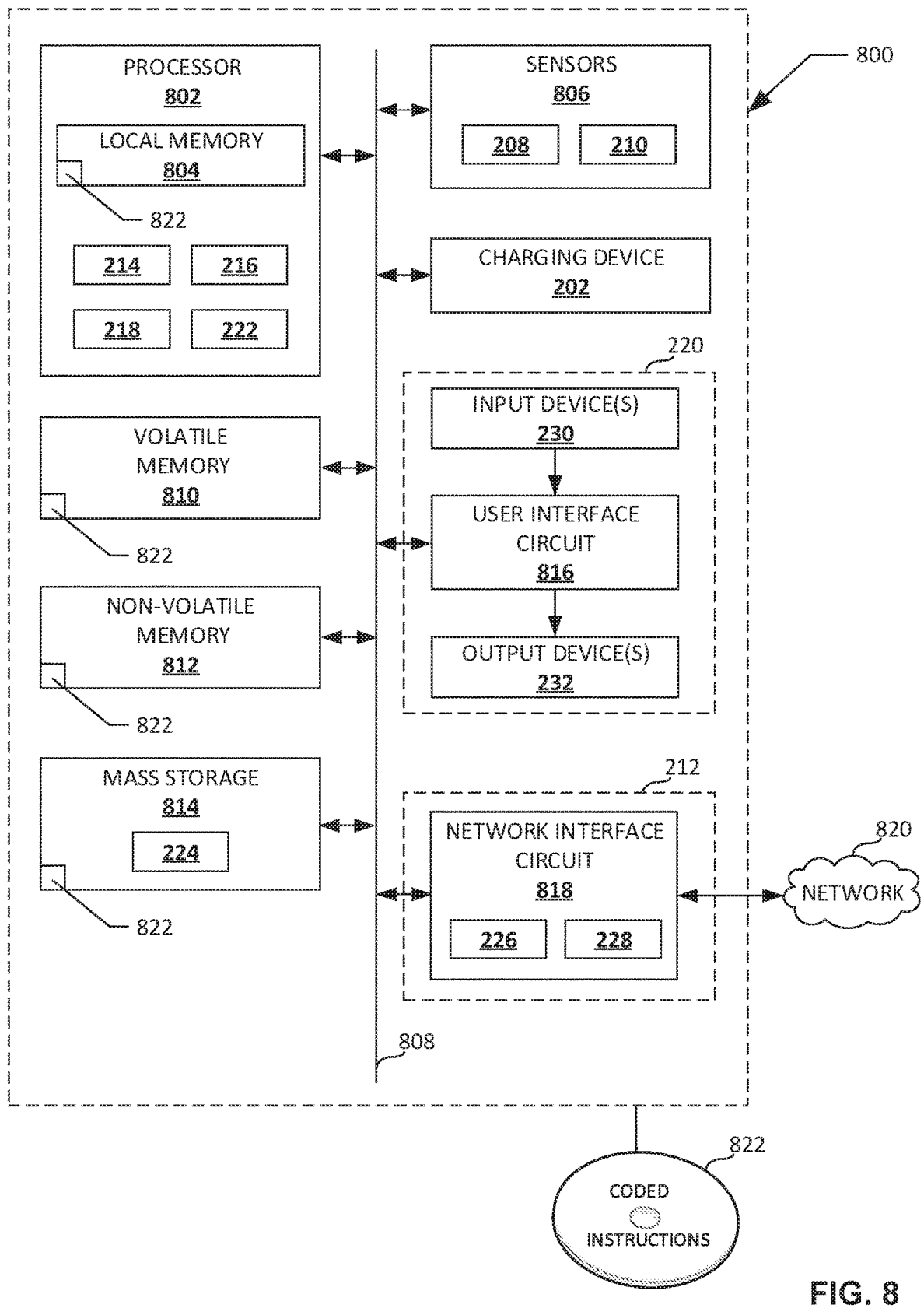
FIG. 8 is an example processor platform capable of executing instructions to implement the method of FIG. 5 and the example vehicle-based drone charging apparatus of FIGS. 1 and 2.

FIG. 8 is an example processor platform 800 capable of executing instructions to implement the method of FIG. 5 and the example vehicle-based drone charging apparatus 110 of FIGS. 1 and/or 2. The processor platform 800 of the illustrated example includes a processor 802. The processor 802 of the illustrated example is hardware. For example, the processor 802 can be implemented by one or more integrated circuit(s), logic circuit(s), processor(s), microprocessor(s), controller(s) or microcontroller(s) from any desired family or manufacturer. The processor 802 of the illustrated example includes a local memory 804 (e.g., a cache). In the illustrated example, the processor 802 includes the example payment verifier 214, the example drone authenticator 216, the example security manager 218, and the example charging controller 222 of FIG. 2.

The processor 802 of the illustrated example is in communication with one or more example sensors 806 via a bus 808. The example sensors 806 include the example sensor 208 and the example GPS receiver 210 of FIG. 2.

The processor 802 of the illustrated example is also in communication with a main memory including a volatile memory 810 and a non-volatile memory 812 via the bus 808. The volatile memory 810 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 812 may be implemented by flash memory and/or any other desired type of memory device. Access to the volatile memory 810 and the non-volatile memory 812 is controlled by a memory controller.

The processor 802 of the illustrated example is also in communication with one or more mass storage devices 814 for storing software and/or data. Examples of such mass storage devices 814 include floppy disk drives, hard drive disks, compact disk drives, Blu-ray disk drives, RAID systems, and digital versatile disk (DVD) drives. In the illustrated example, the mass storage device 814 includes the example memory 224 of FIG. 2.

The processor platform 800 of the illustrated example also includes a user interface circuit 816. The user interface circuit 816 may be implemented by any type of interface standard, such as an Ethernet interface, a universal serial bus (USB), and/or a PCI express interface. In the illustrated example, one or more input device(s) 230 are connected to the user interface circuit 816. The input device(s) 230 permit(s) a user to enter data and commands into the processor 802. The input device(s) 230 can be implemented by, for example, an audio sensor, a camera (still or video), a keyboard, a button, a mouse, a touchscreen, a track-pad, a trackball, isopoint, a voice recognition system, a microphone, and/or a liquid crystal display. One or more output device(s) 232 are also connected to the user interface circuit 816 of the illustrated example. The output device(s) 232 can be implemented, for example, by a light emitting diode, an organic light emitting diode, a liquid crystal display, a touchscreen and/or a speaker. The user interface circuit 816 of the illustrated example may, thus, include a graphics driver such as a graphics driver chip and/or processor. In the illustrated example, the input device(s) 230, the output device(s) 232 and the user interface circuit 816 collectively form the example user interface 220 of FIG. 2.

The processor platform 800 of the illustrated example also includes a network interface circuit 818. The network interface circuit 818 may be implemented by any type of interface standard, such as an Ethernet interface, a universal serial bus (USB), and/or a PCI express interface. In the illustrated example, the network interface circuit 818 includes the example radio transmitter 226 and the example radio receiver 228 of FIG. 2 to facilitate the exchange of data and/or signals with external machines (e.g., the remote server 150 of FIGS. 1 and/or 3) via a network 820 (e.g., a cellular network, a wireless local area network (WLAN), etc.), such as the example cellular network 140 of FIG. 1. In the illustrated example, the radio transmitter 226, the radio receiver 228 and the network interface circuit 818 collectively form the example communication interface 212 of FIG. 2.

Coded instructions 822 for implementing the method of FIG. 5 may be stored in the local memory 804, in the volatile memory 810, in the non-volatile memory 812, in the mass storage device 814, and/or on a removable tangible computer readable storage medium such as a CD or DVD.

Figure 9:
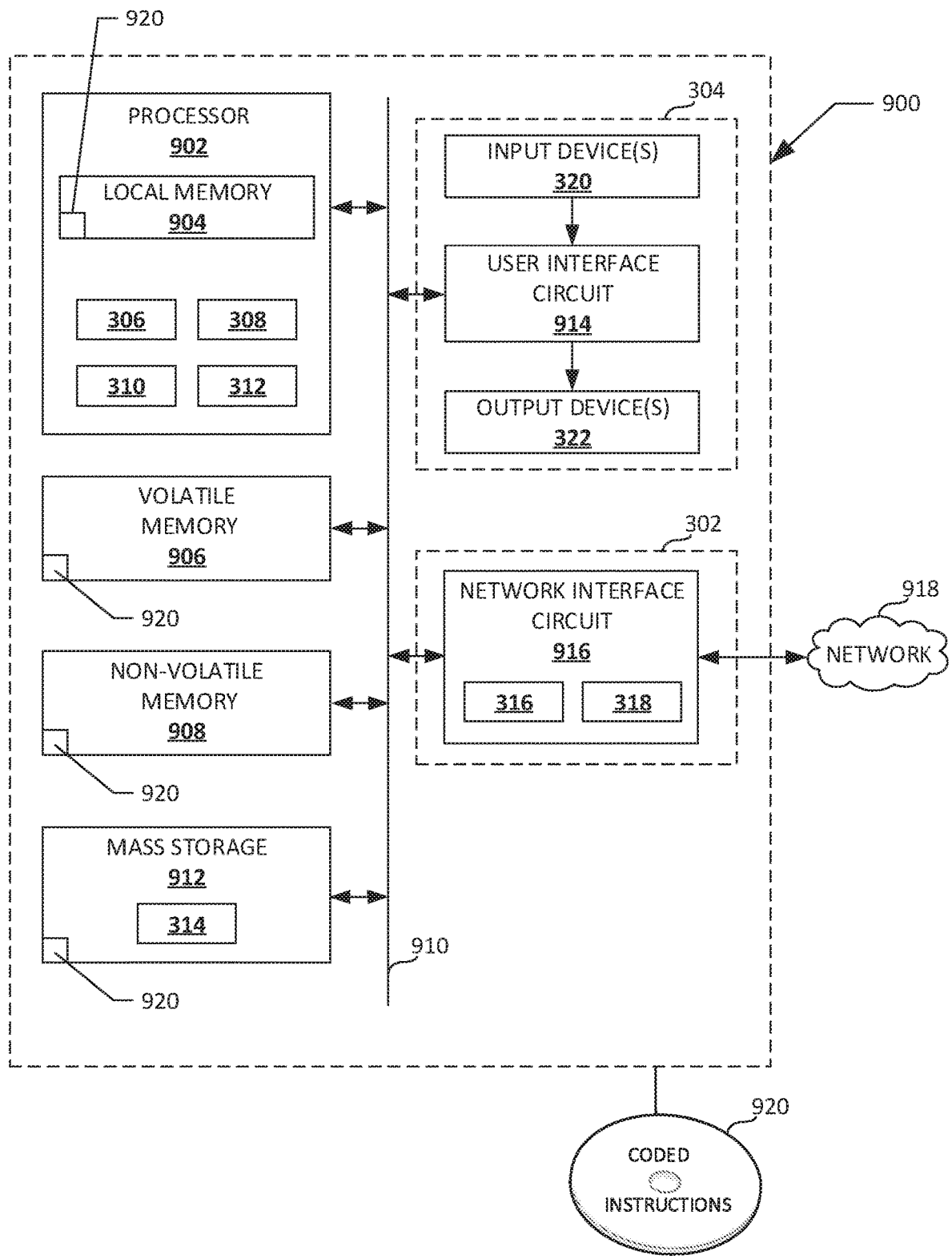
FIG. 9 is an example processor platform capable of executing instructions to implement the method of FIG. 6 and the example remote server of FIGS. 1 and 3.

FIG. 9 is an example processor platform 900 capable of executing instructions to implement the method of FIG. 6 and the example remote server 150 of FIGS. 1 and/or 3. The processor platform 900 of the illustrated example includes a processor 902. The processor 902 of the illustrated example is hardware. For example, the processor 902 can be implemented by one or more integrated circuit(s), logic circuit(s), processor(s), microprocessor(s), controller(s) or microcontroller(s) from any desired family or manufacturer. The processor 902 of the illustrated example includes a local memory 904 (e.g., a cache). In the illustrated example, the processor 902 includes the example data aggregator 306, the example charging service matcher 308, the example reservation manager 310 and the example payment verifier 312 of FIG. 3.

The processor 902 of the illustrated example is in communication with a main memory including a volatile memory 906 and a non-volatile memory 908 via a bus 910. The volatile memory 906 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 908 may be implemented by flash memory and/or any other desired type of memory device. Access to the volatile memory 906 and the non-volatile memory 908 is controlled by a memory controller.

The processor 902 of the illustrated example is also in communication with one or more mass storage devices 912 for storing software and/or data. Examples of such mass storage devices 912 include floppy disk drives, hard drive disks, compact disk drives, Blu-ray disk drives, RAID systems, and digital versatile disk (DVD) drives. In the illustrated example, the mass storage device 912 includes the example memory 314 of FIG. 3.

The processor platform 900 of the illustrated example also includes a user interface circuit 914. The user interface circuit 914 may be implemented by any type of interface standard, such as an Ethernet interface, a universal serial bus (USB), and/or a PCI express interface. In the illustrated example, one or more input device(s) 320 are connected to the user interface circuit 914. The input device(s) 320 permit(s) a user to enter data and commands into the processor 902. The input device(s) 320 can be implemented by, for example, an audio sensor, a camera (still or video), a keyboard, a button, a mouse, a touchscreen, a track-pad, a trackball, isopoint, a voice recognition system, a microphone, and/or a liquid crystal display. One or more output device(s) 322 are also connected to the user interface circuit 914 of the illustrated example. The output device(s) 322 can be implemented, for example, by a light emitting diode, an organic light emitting diode, a liquid crystal display, a touchscreen and/or a speaker. The user interface circuit 914 of the illustrated example may, thus, include a graphics driver such as a graphics driver chip and/or processor. In the illustrated example, the input device(s) 320, the output device(s) 322 and the user interface circuit 914 collectively form the example user interface 304 of FIG. 3.

The processor platform 900 of the illustrated example also includes a network interface circuit 916. The network interface circuit 916 may be implemented by any type of interface standard, such as an Ethernet interface, a universal serial bus (USB), and/or a PCI express interface. In the illustrated example, the network interface circuit 916 includes the example radio transmitter 316 and the example radio receiver 318 of FIG. 3 to facilitate the exchange of data and/or signals with external machines (e.g., the vehicle-based drone charging apparatus 110 of FIGS. 1 and/or 2 and/or the mobile device 170 of FIGS. 1 and/or 4) via a network 918 (e.g., a cellular network, a wireless local area network (WLAN), etc.), such as the example cellular network 140 of FIG. 1. In the illustrated example, the radio transmitter 316, the radio receiver 318 and the network interface circuit 916 collectively form the example communication interface 302 of FIG. 3.

Coded instructions 920 for implementing the method of FIG. 6 may be stored in the local memory 904, in the volatile memory 906, in the non-volatile memory 908, in the mass storage device 912, and/or on a removable tangible computer readable storage medium such as a CD or DVD.

Figure 10:
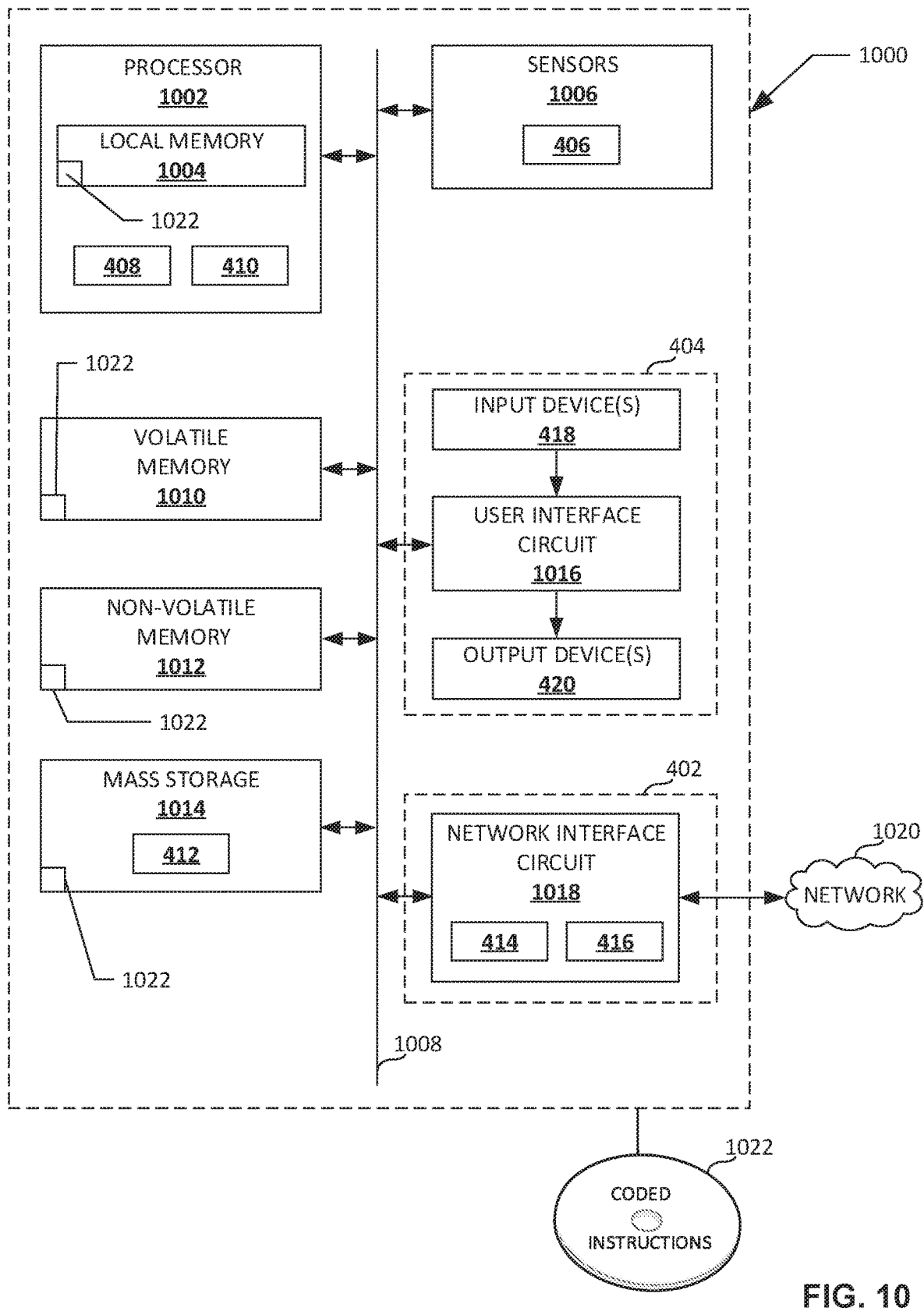
FIG. 10 is an example processor platform capable of executing instructions to implement the method of FIG. 7 and the example mobile device of FIGS. 1 and 4.

FIG. 10 is an example processor platform 1000 capable of executing instructions to implement the method of FIG. 7 and the example mobile device 170 of FIGS. 1 and/or 4. The processor platform 1000 of the illustrated example includes a processor 1002. The processor 1002 of the illustrated example is hardware. For example, the processor 1002 can be implemented by one or more integrated circuit(s), logic circuit(s), processor(s), microprocessor(s), controller(s) or microcontroller(s) from any desired family or manufacturer. The processor 1000 of the illustrated example includes a local memory 1004 (e.g., a cache). In the illustrated example, the processor includes the example charging service matcher 408 and the example reservation manager 410 of FIG. 4.

The processor 1002 of the illustrated example is in communication with one or more example sensors 1006 via a bus 1008. The example sensors 1006 include the example GPS receiver 406 of FIG. 4.

The processor 1000 of the illustrated example is also in communication with a main memory including a volatile memory 1010 and a non-volatile memory 1012 via the bus 1008. The volatile memory 1010 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1012 may be implemented by flash memory and/or any other desired type of memory device. Access to the volatile memory 1010 and the non-volatile memory 1012 is controlled by a memory controller.

The processor 1000 of the illustrated example is also in communication with one or more mass storage devices 1014 for storing software and/or data. Examples of such mass storage devices 1014 include SD cards. In the illustrated example, the mass storage device 1014 includes the example memory 412 of FIG. 4.

The processor platform 1000 of the illustrated example also includes a user interface circuit 1016. The user interface circuit 1016 may be implemented by any type of interface standard, such as an Ethernet interface, a universal serial bus (USB), and/or a PCI express interface. In the illustrated example, one or more input device(s) 418 are connected to the user interface circuit 1016. The input device(s) 418 permit(s) a user to enter data and commands into the processor 1002. The input device(s) 418 can be implemented by, for example, an audio sensor, a camera (still or video), a keyboard, a button, a mouse, a touchscreen, a track-pad, a trackball, isopoint, a voice recognition system, a microphone, and/or a liquid crystal display. One or more output device(s) 420 are also connected to the user interface circuit 1016 of the illustrated example. The output device(s) 420 can be implemented, for example, by a light emitting diode, an organic light emitting diode, a liquid crystal display, a touchscreen and/or a speaker. The user interface circuit 1016 of the illustrated example may, thus, include a graphics driver such as a graphics driver chip and/or processor. In the illustrated example, the input device(s) 418, the output device(s) 420 and the user interface circuit 1016 collectively form the example user interface 404 of FIG. 4.

The processor platform 1000 of the illustrated example also includes a network interface circuit 1018. The network interface circuit 1018 may be implemented by any type of interface standard, such as an Ethernet interface, a universal serial bus (USB), and/or a PCI express interface. In the illustrated example, the network interface circuit 1018 includes the example radio transmitter 414 and the example radio receiver 416 of FIG. 4 to facilitate the exchange of data and/or signals with external machines (e.g., the remote server 150 of FIGS. 1 and/or 3) via a network 1020 (e.g., a cellular network, a wireless local area network (WLAN), etc.), such as the example cellular network 140 of FIG. 1. In the illustrated example, the radio transmitter 414, the radio receiver 416 and the network interface circuit 1018 collectively form the example communication interface 402 of FIG. 4.

Coded instructions 1022 for implementing the method of FIG. 7 may be stored in the local memory 1004, in the volatile memory 1010, in the non-volatile memory 1012, in the mass storage device 1014, and/or on a removable tangible computer readable storage medium such as a CD or DVD.

From the foregoing, it will be appreciated that the disclosed methods and apparatus for vehicle-based drone charging provide advantages over known approaches for drone charging. The disclosed methods and apparatus provide new options for charging to drones and to operators of drones that enable drone and drone operators to extend flight time, reduce overhead, reduce preparation time (e.g., charging numerous LiPo batteries in advance and monitoring of charging), travel lighter, and even extend an operational range for some drones (e.g., autonomous drones).

In some examples, a vehicle-based drone charging apparatus is disclosed. In some disclosed examples, the charging apparatus includes a charging device to be operatively coupled to a vehicle. In some disclosed examples, the charging device is to charge a drone in response to the drone being operatively coupled to the charging device. In some disclosed examples, the vehicle-based drone charging apparatus further includes a communication interface to be operatively coupled to the vehicle. In some disclosed examples, the communication interface is to broadcast use information associated with the charging device. In some disclosed examples, the use information includes location information associated with a location of the vehicle and fee information associated with a cost for use of the charging device.

In some disclosed examples, the charging device includes a charging pad to wirelessly charge the drone. In some disclosed examples, the charging pad is to be positioned on a drone-accessible surface of the vehicle.

In some disclosed examples, the use information further includes availability information associated with a time at which the charging device is available for use, charging device type information associated with a type of the charging device, and charge rate information associated with a rate at which the charging device is able to charge a battery.

In some disclosed examples, the communication interface is to receive a reservation confirmation. In some disclosed examples, the reservation confirmation includes time information associated with a time at which the drone is to use the charging device and authentication information associated with an identifiable feature of the drone.

In some disclosed examples, the vehicle-based drone charging apparatus further includes a weight sensor operatively coupled to the charging device. In some disclosed examples, the weight sensor is to detect an object being positioned on the charging device.

In some disclosed examples, the vehicle-based drone charging apparatus further includes a charging controller operatively coupled to the charging device. In some disclosed examples, the charging controller is to enable charging of the drone via the charging device in response to detecting a verification of payment information corresponding to the cost for use of the charging device. In some disclosed examples, the charging controller is to operatively couple the drone to the charging device by wirelessly pairing the drone with the vehicle. In some disclosed examples, the pairing is to enable charging of the drone via the charging device.

In some examples, a method to charge a drone via a vehicle-based drone charging apparatus is disclosed. In some disclosed examples, the method includes broadcasting use information via a communication interface operatively coupled to a vehicle. In some disclosed examples, the use information is associated with a charging device operatively coupled to the vehicle. In some disclosed examples, the use information includes location information associated with a location of the vehicle and fee information associated with a cost for use of the charging device. In some disclosed examples, the method further includes charging the drone via the charging device in response to the drone being operatively coupled to the charging device.

In some disclosed examples of the method, the charging device includes a charging pad to wirelessly charge the drone. In some disclosed examples, the charging pad is to be positioned on a drone-accessible surface of the vehicle.

In some disclosed examples of the method, the use information further includes availability information associated with a time at which the charging device is available for use, charging device type information associated with a type of the charging device, and charge rate information associated with a rate at which the charging device is able to charge a battery.

In some disclosed examples, the method further includes receiving a reservation confirmation via the communication interface. In some disclosed examples, the reservation confirmation includes time information associated with a time at which the drone is to use the charging device and authentication information associated with an identifiable feature of the drone.

In some disclosed examples, the method further includes detecting, via a weight sensor operatively coupled to the charging device, an object being positioned on the charging device.

In some disclosed examples, the method further includes enabling, via a charging controller operatively coupled to the charging device, charging of the drone via the charging device in response to detecting a verification of payment information corresponding to the cost for use of the charging device. In some disclosed examples, the method further includes operatively coupling the drone to the charging device by wirelessly pairing the drone with the vehicle via the charging controller. In some disclosed examples, the pairing is to enable charging of the drone via the charging device.

In some examples, a tangible machine readable storage medium comprising instructions is disclosed. In some disclosed examples, the instructions, when executed, cause a processor to broadcast use information via a communication interface operatively coupled to a vehicle. In some disclosed examples, the use information is associated with a charging device operatively coupled to the vehicle. In some disclosed examples, the use information includes location information associated with a location of the vehicle and fee information associated with a cost for use of the charging device. In some disclosed examples, the instructions, when executed, further cause the processor to charge the drone via the charging device in response to the drone being operatively coupled to the charging device.

In some disclosed examples of the tangible machine readable storage medium, the charging device includes a charging pad to wirelessly charge the drone. In some disclosed examples, the charging pad is to be positioned on a drone-accessible surface of the vehicle.

In some disclosed examples of the tangible machine readable storage medium, the use information further includes availability information associated with a time at which the charging device is available for use, charging device type information associated with a type of the charging device, and charge rate information associated with a rate at which the charging device is able to charge a battery.

In some disclosed examples, the instructions, when executed, are further to cause the processor to receive a reservation confirmation via the communication interface. In some disclosed examples, the reservation confirmation includes time information associated with a time at which the drone is to use the charging device and authentication information associated with an identifiable feature of the drone.

In some disclosed examples, the instructions, when executed, are further to cause the processor to detect, via a weight sensor operatively coupled to the charging device, an object being positioned on the charging device.

In some disclosed examples, the instructions, when executed, are further to cause the processor to enable, via a charging controller operatively coupled to the charging device, charging of the drone via the charging device in response to detecting a verification of payment information corresponding to the cost for use of the charging device. In some disclosed examples, the instructions, when executed, are further to cause the processor to operatively couple the drone to the charging device by wirelessly pairing the drone with the vehicle via the charging controller. In some disclosed examples, the pairing is to enable charging of the drone via the charging device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A vehicle-based drone charging apparatus, comprising:
    a charging device to be operatively coupled to a vehicle, the charging device to charge a drone in response to the drone being operatively coupled to the charging device, the vehicle at a first location; and
    a communication interface to be operatively coupled to the vehicle, the communication interface to:
        broadcast use information associated with the charging device, the use information including location information associated with the first location of the vehicle, vehicle movement information, and fee information associated with a cost for use of the charging device, the first location being a current location of the vehicle, the vehicle movement information including a route of the vehicle, the route indicating that the vehicle will be at a second location at a first future time, the route indicating that the vehicle will be at a third location at a second future time, the second future time after the first future time; and
        receive a reservation confirmation, the reservation confirmation including time information associated with a second indication that the drone is to use the charging device at the first future time at the second location and authentication information associated with an identifiable feature of the drone.

2. The vehicle-based drone charging apparatus of claim 1, wherein the charging device comprises a charging pad to wirelessly charge the drone, the charging pad to be positioned on a drone-accessible surface of the vehicle.

3. The vehicle-based drone charging apparatus of claim 1, wherein the use information includes availability information associated with the first future time at which the charging device is available for use, charging device type information associated with a type of the charging device, and charge rate information associated with a rate at which the charging device is able to charge a battery.

4. The vehicle-based drone charging apparatus of claim 1, wherein the reservation confirmation includes a third indication that the drone is to embark the vehicle at the second location at the first future time and is to disembark the vehicle at the third location at the second future time.

5. The vehicle-based drone charging apparatus of claim 1, further comprising a weight sensor operatively coupled to the charging device, the weight sensor to detect an object being positioned on the charging device.

6. The vehicle-based drone charging apparatus of claim 1, further comprising a charging controller operatively coupled to the charging device, the charging controller to enable charging of the drone via the charging device in response to detecting a verification of payment information corresponding to the cost for use of the charging device.

7. The vehicle-based drone charging apparatus of claim 6, wherein the charging controller is to operatively couple the drone to the charging device by wirelessly pairing the drone with the vehicle, the pairing to enable charging of the drone via the charging device.

8. A method to replace a drone battery of a drone via a vehicle, the method comprising:
    broadcasting use information via a communication interface operatively coupled to the vehicle, the use information associated with a replacement battery carried by the vehicle, the use information including location information associated with a first location of the vehicle, vehicle movement information, and fee information associated with a cost for replacing the drone battery with the replacement battery, the vehicle movement information including a route of the vehicle, the route indicating that the vehicle will be at a second location at a first future time, the route indicating that the vehicle will be at a third location at a second future time, the second future time after the first future time;
    receiving a reservation confirmation, the reservation confirmation including time information associated with a second indication that the drone is to arrive at the vehicle at the first future time at the second location and authentication information associated with an identifiable feature of the drone; and
    enabling via a controller operatively coupled to the vehicle, replacement of the drone battery with the replacement battery in response to detecting a verification of payment information corresponding to the cost for the replacement battery, the enablement including unlocking of a compartment of the vehicle including the replacement battery.

9. The method of claim 8, wherein the vehicle includes a pad to be positioned on a drone-accessible surface of the vehicle.

10. The method of claim 9, further comprising detecting, via a weight sensor operatively coupled to the vehicle, an object being positioned on the pad.

11. The method of claim 8, wherein the use information includes availability information associated with a time at which the vehicle is available for use and a type of battery available at the vehicle.

12. The method of claim 8, further including pairing the drone with the vehicle via the controller, the pairing to enable the replacement of the drone battery.

13. The method of claim 8, wherein the reservation confirmation includes a third indication that the drone is to embark the vehicle at the second location at the first future time and is to disembark the vehicle at the third location at the second future time.

14. A non-transitory machine readable storage medium comprising instructions that, when executed, cause a processor to at least:
    broadcast use information via a communication interface operatively coupled to a vehicle, the use information associated with a replacement battery carried by the vehicle, the use information including location information associated with a first location of the vehicle, vehicle movement information, and fee information associated with a cost for replacing a drone battery of a drone with the replacement battery, the first location being a current location of the vehicle, the vehicle movement information including a route of the vehicle, the route indicating that the vehicle will be at a second location at a first future time, the route indicating that the vehicle will be at a third location at a second future time, the second future time after the first future time;

receive a reservation confirmation, the reservation confirmation including time information associated with a second indication that the drone is to arrive at the vehicle at the first future time at the second location and authentication information associated with an identifiable feature of the drone; and enabling via a controller operatively coupled to the vehicle, replacement of the drone battery of the drone with the replacement battery in response to detecting a verification of payment information corresponding to the cost for the replacement battery, the enablement including unlocking of a compartment of the vehicle including the replacement battery.

15. The non-transitory machine readable storage medium of claim 14, wherein the reservation confirmation includes a third indication that the drone is to embark the vehicle at the second location at the first future time and is to disembark the vehicle at the third location at the second future time.

16. The non-transitory machine readable storage medium of claim 14, wherein the vehicle includes a pad to be positioned on a drone-accessible surface of the vehicle.

17. The non-transitory machine readable storage medium of claim 16, wherein the instructions, when executed, further cause the processor to detect, via a weight sensor operatively coupled to the vehicle, an object being positioned on the pad.

18. The non-transitory machine readable storage medium of claim 14, wherein the use information includes availability information associated with a time at which the vehicle is available for use and a type of battery available at the vehicle.

19. The non-transitory machine readable storage medium of claim 14, wherein the instructions, when executed, further cause the processor to pair the drone with the vehicle via the controller, the pairing to enable the replacement of the drone battery.

* * * * *